US012675870B2

(12) United States Patent
Nishio

(10) Patent No.: US 12,675,870 B2
(45) Date of Patent: Jul. 7, 2026

(54) METHOD AND APPARATUS FOR DETECTING FOREIGN OBJECT INCLUDED IN INSPECTION TARGET

(71) Applicant: Panasonic Intellectual Property Management Co., Ltd., Osaka (JP)

(72) Inventor: Kazuaki Nishio, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 369 days.

(21) Appl. No.: 18/346,824

(22) Filed: Jul. 4, 2023

(65) Prior Publication Data

US 2023/0419478 A1     Dec. 28, 2023

Related U.S. Application Data

(63) Continuation of application No. PCT/JP2022/001492, filed on Jan. 18, 2022.

(30) Foreign Application Priority Data

Jan. 26, 2021     (JP) ................................. 2021-010386

(51) Int. Cl.
*G06T 7/00* (2017.01)
*G01V 8/10* (2006.01)
*G06T 7/70* (2017.01)

(52) U.S. Cl.
CPC ................ *G06T 7/001* (2013.01); *G01V 8/10* (2013.01); *G06T 7/70* (2017.01); *G06T 2207/10036* (2013.01); *G06T 2207/30128* (2013.01)

(58) Field of Classification Search
CPC . G06T 7/001; G06T 7/70; G06T 2207/10036; G06T 2207/30128;

(Continued)

(56) References Cited

U.S. PATENT DOCUMENTS

2011/0170783 A1*     7/2011 Ono ...................... G06V 30/248
                                                           382/192
2018/0365822 A1*     12/2018 Nipe ...................... G06T 7/0008
(Continued)

FOREIGN PATENT DOCUMENTS

CN          112218729          1/2021
JP          2005-094185          4/2005
(Continued)

OTHER PUBLICATIONS

Salma Sultana Tunny, Hary Kurniawan, Hanim Z. Amanah, Insuck Baek, Moon S. Kim, Diane Chan, Mohammad Akbar Faqeerzada, Collins Wakholi, Byoung-Kwan Cho, Hyperspectral imaging techniques for detection of foreign materials from fresh-cut vegetables, Postharvest Biology and Technology, vol. 201, 2023 (Year: 2023).*

(Continued)

*Primary Examiner* — Emily C Terrell
(74) *Attorney, Agent, or Firm* — Wenderoth, Lind & Ponack, L.L.P.

(57)          ABSTRACT

A method for detecting a foreign object included in an inspection target includes acquiring first image data for the target, for which pixels each have a pixel value for a first band group including one or more wavelength bands; determining, from the first image data, one or more pixel regions that satisfy a first condition to be one or more first foreign object regions; acquiring second image data for one or more regions including the first foreign object regions, the one or more regions having pixels each of which has pixel values for a second band group including a larger number of wavelength bands than the first band group; determining, from the second image data, one or more pixel regions that satisfy a second condition to be one or more second foreign object regions, in which the foreign object is present; and (Continued)

| INSPECTION SAMPLE NO. | DATE AND TIME (m/d/y_h:m:s) | FOREIGN OBJECT ID | WARNING (ISSUED: ●) | FOREIGN OBJECT TYPE | COORDINATES (x, y) | DIAMETER (mm) |
|---|---|---|---|---|---|---|
| 1 | mm/dd/yyyy_hh:mm:ss | 1_001 | ● | METAL 1 | xxx, yyy | 3 |
| 1 | mm/dd/yyyy_hh:mm:ss | 1_002 | | METAL 2 | xxx, yyy | 2 |
| 1 | mm/dd/yyyy_hh:mm:ss | 1_003 | | METAL 2 | xxx, yyy | 3 |
| 2 | mm/dd/yyyy_hh:mm:ss | 2_001 | | METAL 2 | xxx, yyy | 2 |
| 2 | mm/dd/yyyy_hh:mm:ss | 2_002 | | METAL 2 | xxx, yyy | 1 |
| 3 | mm/dd/yyyy_hh:mm:ss | 3_001 | | METAL 2 | xxx, yyy | 3 |
| 3 | mm/dd/yyyy_hh:mm:ss | 3_002 | | METAL 2 | xxx, yyy | 2 |
| 3 | mm/dd/yyyy_hh:mm:ss | 3_003 | ● | METAL 1 | xxx, yyy | 3 |
| 3 | mm/dd/yyyy_hh:mm:ss | 3_004 | | METAL 2 | xxx, yyy | 1 | outputting information regarding the second foreign object regions.

14 Claims, 18 Drawing Sheets

(58) Field of Classification Search
CPC ... G06T 2207/10024; G06T 1/00; G06T 3/40; G01V 8/10; G01N 21/27; G01N 21/88
See application file for complete search history.

(56) References Cited

U.S. PATENT DOCUMENTS

| 2020/0386690 | A1* | 12/2020 | Furihata | ............... | G06T 7/0008 |
| 2021/0121922 | A1* | 4/2021 | Schmidt | ............. | G01N 21/8851 |
| 2021/0158108 | A1 | 5/2021 | Ando | | |
| 2021/0247233 | A1 | 8/2021 | Aizawa et al. | | |
| 2023/0115037 | A1* | 4/2023 | deFreese | ......... | G05B 19/41875 |
| | | | | | 700/109 |

FOREIGN PATENT DOCUMENTS

| JP | 2018-146251 | 9/2018 |
| JP | 6397952 | 9/2018 |
| JP | 2020-524326 | 8/2020 |
| JP | 2021-110636 | 8/2021 |
| WO | 2018/236844 | 12/2018 |
| WO | 2020/080045 | 4/2020 |

OTHER PUBLICATIONS

Shu, Z.; Li, X.; Liu, Y. Detection of Chili Foreign Objects Using Hyperspectral Imaging Combined with Chemometric and Target Detection Algorithms. Foods 2023, 12, 2618. https://doi.org/10.3390/foods12132618 (Year: 2023).*

International Search Report of PCT application No. PCT/JP2022/001492 dated Mar. 29, 2022.

English translation of Search Report issued Jun. 19, 2025 for the corresponding Chinese Patent Application No. 202280009183.6.

* cited by examiner

| INSPECTION SAMPLE NO. | DATE AND TIME (m/d/y_h:m:s) | FOREIGN OBJECT ID | WARNING (ISSUED: ●) | FOREIGN OBJECT TYPE | COORDINATES (x, y) | DIAMETER (mm) |
|---|---|---|---|---|---|---|
| 1 | mm/dd/yyyy_hh:mm:ss | 1_001 | ● | METAL 1 | xxx, yyy | 3 |
| 1 | mm/dd/yyyy_hh:mm:ss | 1_002 | | METAL 2 | xxx, yyy | 2 |
| 1 | mm/dd/yyyy_hh:mm:ss | 1_003 | | METAL 2 | xxx, yyy | 3 |
| 2 | mm/dd/yyyy_hh:mm:ss | 2_001 | | METAL 2 | xxx, yyy | 2 |
| 2 | mm/dd/yyyy_hh:mm:ss | 2_002 | | METAL 2 | xxx, yyy | 1 |
| 3 | mm/dd/yyyy_hh:mm:ss | 3_001 | | METAL 2 | xxx, yyy | 3 |
| 3 | mm/dd/yyyy_hh:mm:ss | 3_002 | | METAL 2 | xxx, yyy | 2 |
| 3 | mm/dd/yyyy_hh:mm:ss | 3_003 | ● | METAL 1 | xxx, yyy | 3 |
| 3 | mm/dd/yyyy_hh:mm:ss | 3_004 | | METAL 2 | xxx, yyy | 1 |

METHOD AND APPARATUS FOR DETECTING FOREIGN OBJECT INCLUDED IN INSPECTION TARGET

BACKGROUND

1. Technical Field

The present disclosure relates to a method and an apparatus for detecting a foreign object included in an inspection target.

2. Description of the Related Art

The detailed physical properties of a target that cannot be obtained using an existing RGB image that has information only regarding three bands can be grasped by making good use of spectrum information regarding many wavelength bands (for example, ten or more bands) each of which is a narrow band. A camera that acquires such multi-wavelength information is called a "hyperspectral camera". A hyperspectral camera is used in various fields such as food inspection, biopsy, drug development, and mineral composition analysis. Wavelength bands may be referred to as bands in the present specification and the drawings.

Japanese Unexamined Patent Application Publication (Translation of PCT Application) No. 2020-524326 discloses a system and a method for determining the quality of food or detecting a foreign object contained in food on the basis of a hyperspectral image of the food.

International Publication No. 2020/080045 discloses a method for recognizing, using machine learning, an object from a hyperspectral image generated using compressed sensing.

Japanese Patent No. 6778451 discloses a method for recognizing and analyzing a foreign object in an object to be measured such as a test sample using a microspectrometer that irradiates the object to be measured with light and measures a spectroscopic spectrum of transmitted light, reflected light, scattered light, or fluorescence.

SUMMARY

One non-limiting and exemplary embodiment provides a technology for reducing the processing load for detecting a foreign object included in an inspection target.

A method according to an aspect of the present disclosure is a method for detecting a specific foreign object included in an inspection target. In one general aspect, the techniques disclosed here feature a method for detecting a specific foreign object included in an inspection target. The method includes acquiring first image data for the inspection target, for which pixels each have a pixel value for a first band group including one or more wavelength bands; determining, from the first image data, one or more pixel regions that satisfy a first condition to be one or more first foreign object regions; acquiring second image data for one or more regions including the one or more first foreign object regions, the one or more regions having pixels each of which has pixel values for a second band group including a larger number of wavelength bands than the first band group; determining, from the second image data, one or more pixel regions that satisfy a second condition, which is different from the first condition, to be one or more second foreign object regions, in which the specific foreign object is present; and outputting information regarding the one or more second foreign object regions.

A general or specific embodiment according to the present disclosure may be realized by a system, an apparatus, a method, an integrated circuit, a computer program, or a computer readable recording medium or by a combination of some or all of a system, an apparatus, a method, an integrated circuit, a computer program, and a recording medium. Examples of the computer readable recording medium include a nonvolatile recording medium such as a compact disc read-only memory (CD-ROM). The apparatus may be formed by one or more devices. In a case where the apparatus is formed by two or more devices, the two or more devices may be arranged in one apparatus or may be arranged in two or more separate apparatuses in a divided manner. In the present specification and the claims, an "apparatus" may refer not only to one apparatus but also to a system formed by apparatuses.

According to an aspect of the present disclosure, a data processing load in a system for detecting a foreign object included in an inspection target can be reduced.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 is a block diagram illustrating an example of the configuration of the inspection system;

FIG. 9 is a diagram illustrating an example of information stored by a storage device;

DETAILED DESCRIPTIONS

Figure 1A:
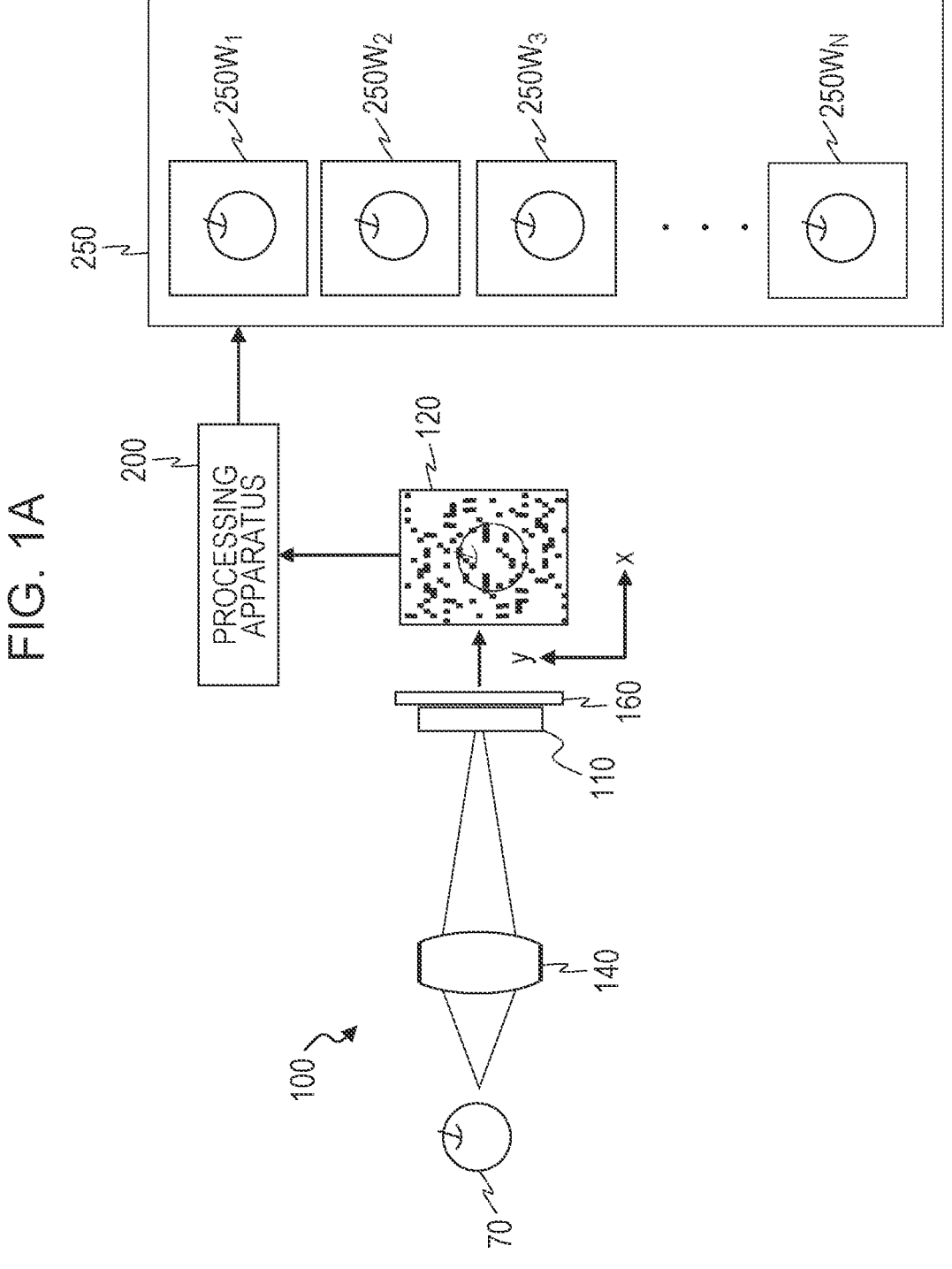
FIG. 1A is a diagram schematically illustrating an example of the configuration of a hyperspectral imaging system.

Any one of embodiments to be described below is intended to represent a general or specific example. Numerical values, shapes, materials, constituent elements, arrangement positions and connection forms of the constituent elements, steps, and the order of steps are examples, and are not intended to limit the technologies of the present disclosure. Among the constituent elements of the following embodiments, constituent elements that are not described in independent claims representing the most generic concept will be described as optional constituent elements. Each drawing is a schematic diagram and is not necessarily precisely illustrated. Furthermore, in each drawing, substantially the same or similar constituent elements are denoted by the same reference signs. Redundant description may be omitted or simplified.

In the present disclosure, all or some of circuits, units, devices, members, or portions or all or some of the functional blocks of a block diagram may be executed by, for example, one or more electronic circuits including a semiconductor device, a semiconductor integrated circuit (IC), or a large-scale integration circuit (LSI). The LSI or the IC may be integrated onto one chip or may be formed by combining chips. For example, functional blocks other than a storage device may be integrated onto one chip. In this case, the term LSI or IC is used; however, the term(s) to be used may change depending on the degree of integration, and the terms system LSI, very large-scale integration circuit (VLSI), or ultra-large-scale integration circuit (ULSI) may be used. A field-programmable gate array (FPGA) or a reconfigurable logic device that allows reconfiguration of interconnection inside the LSI or setup of a circuit section inside the LSI can also be used for the same purpose, the FPGA and the reconfigurable logic device being programmed after the LSIs are manufactured.

Furthermore, functions or operations of all or some of the circuits, the units, the devices, the members, or the portions can be executed through software processing. In this case, software is recorded in one or more non-transitory recording mediums such as a read-only memory (ROM), an optical disc, or a hard disk drive, and when the software is executed by a processing device (a processor), the function specified by the software is executed by the processing device and peripheral devices. The system or the apparatus may have the one or more non-transitory recording mediums in which the software is recorded, the processing device, and a hardware device to be needed such as an interface.

First, the summary of embodiments of the present disclosure will be described.

A method according to an embodiment of the present disclosure is a method for detecting a specific foreign object included in an inspection target. The method includes (a) acquiring first image data for the inspection target, for which pixels each have a pixel value for a first band group including one or more wavelength bands, (b) determining, from the first image data, one or more pixel regions that satisfy a first condition to be one or more first foreign object regions, (c) acquiring second image data for one or more regions including the one or more first foreign object regions, the one or more regions having pixels each of which has pixel values for a second band group including a larger number of wavelength bands than the first band group, (d) determining, from the second image data, one or more pixel regions that satisfy a second condition, which is different from the first condition, to be one or more second foreign object regions, in which the specific foreign object is present, and (e) outputting information regarding the one or more second foreign object regions.

The above-described method is performed by a computer. According to the above-described method, the one or more first foreign object regions, which satisfy the first condition, are first determined from the first image data, which includes information regarding a relatively small number of bands. Each first foreign object region may be a region in which it is estimated that the specific foreign object is highly likely to be present. In a case where the one or more first foreign object regions are determined, the second image data, which includes information regarding a larger number of bands, is acquired for one or more regions that include the one or more first foreign object regions. From the second image data, one or more pixel regions that satisfy the second condition are determined to be the one or more second foreign object regions, where the specific foreign object is present. Through such an operation, in many cases where the specific foreign object is not present, an inspection ends after performance of determination based only on images of a relatively small number of bands. Only in a case where the specific foreign object may be present, a certain region or certain regions are narrowed down, and an inspection based on images of a larger number of bands is conducted. Through such a two-stage foreign object inspection, the arithmetic processing load can be reduced, and the time required for the entire inspection process can be significantly reduced.

The first condition may be that the one or more pixel regions are constituted by contiguous pixels having pixel values for the first band group, the pixel values satisfying a predetermined condition, and that the size of each pixel region exceeds a predetermined size. For example, in a case where the first band group includes one band and where the size of a set of contiguous pixels whose pixel values for the band are in a predetermined range exceeds a predetermined size, the pixel region constituted by the pixels may be detected as a first foreign object region. Alternatively, in a case where the first band group includes two bands and where the size of a set of contiguous pixels whose ratios or differences between pixel values for these bands are in a predetermined range exceeds a predetermined size, the pixel region constituted by the pixels may be detected as a first foreign object region. Pixels being "contiguous" refer to pixels being adjacent or next to each other in an image. Each "predetermined size" may be, for example, a threshold regarding the number of pixels in the pixel region, the diameter of a circumcircle, the diameter of an incircle, or the like.

The second condition may be that each of the one or more pixel regions is classified into any one of preset classification lists, based on the pixel values for the second band group. For example, in a case where a combination of pixel values (for example, a ratio or the like) for the bands included in the second band group satisfies a preset condition, it can be determined that the pixel region is classified into any one of the preset classification lists. Classification may be performed in accordance with a trained model obtained through learning performed using training data in advance.

Acquiring the first image data may include acquiring compressed image data, which is obtained by compressing, as a two-dimensional image, pieces of image information regarding respective wavelength bands including the second band group, and generating the first image data from the compressed image data. Acquiring the second image data may include extracting the one or more regions including the one or more first foreign object regions from the compressed image data, and generating the second image data, based on data of the one or more extracted regions. The one or more regions that include the one or more first foreign object regions may match the one or more first foreign object regions.

Generating the first image data may include reconstructing the first image data from the compressed image data using a first reconstruction table corresponding to the first band group. Generating the second image data may include reconstructing the second image data from the data of the one or more extracted regions using a second reconstruction table corresponding to the second band group. With this configuration, the first image data and the second image data can be reconstructed with higher accuracy.

The compressed image may be generated by an imaging apparatus including a filter array and an image sensor. The filter array may include types of filter having different transmission spectra from each other. The first reconstruction table and the second reconstruction table may be generated based on a distribution of the transmission spectra of the filters.

The first image data may be acquired through a first imaging operation performed by an imaging apparatus, and the second image data may be acquired through a second imaging operation performed by the imaging apparatus. In that case, the imaging apparatus is not limited to an imaging apparatus provided with the above-described filter array, and may also be any hyperspectral imaging apparatus.

The method may further includes causing an output apparatus to output a warning in a case where the one or more second foreign object regions are detected. The output apparatus may be, for example, one or more devices selected from among a group of a display, a speaker, a beeper, and a lamp. The warning may include, for example, one or more pieces of information selected from among a group of light, sound, an image, a message, and vibration.

The method may further include causing a storage device to store a position of each of the one or more first foreign object regions and a position of each of the one or more second foreign object regions. In this case, each position is a position in an image, and may be specified by two-dimensional coordinate values.

An apparatus according to another embodiment of the present disclosure performs an operation for detecting a foreign object included in an inspection target. The apparatus includes a processor, and a storage medium in which a computer program is stored. The processor executes the computer program to perform (a) acquiring first image data for the inspection target, for which pixels each have a pixel value for a first band group including one or more wavelength bands, (b) determining, from the first image data, one or more pixel regions that satisfy a first condition to be one or more first foreign object regions, (c) acquiring second image data for one or more regions including the one or more first foreign object regions, the one or more regions having pixels each of which has pixel values for a second band group including a larger number of wavelength bands than the first band group, (d) determining, from the second image data, one or more pixel regions that satisfy a second condition, which is different from the first condition, to be one or more second foreign object regions, in which the specific foreign object is present, and (e) outputting information regarding the one or more second foreign object regions.

A non-transitory computer-readable recording medium storing a program according to yet another embodiment of the present disclosure is a non-transitory computer-readable recording medium storing a program for detecting a foreign object included in an inspection target. The program causing a computer to execute: (a) acquiring first image data for the inspection target, for which pixels each have a pixel value for a first band group including one or more wavelength bands, (b) determining, from the first image data, one or more pixel regions that satisfy a first condition to be one or more first foreign object regions, (c) acquiring second image data for one or more regions including the one or more first foreign object regions, the one or more regions having pixels each of which has pixel values for a second band group including a larger number of wavelength bands than the first band group, (d) determining, from the second image data, one or more pixel regions that satisfy a second condition, which is different from the first condition, to be one or more second foreign object regions, in which the specific foreign object is present, and (e) outputting information regarding the one or more second foreign object regions.

In the following, examples of embodiments of the present disclosure will be specifically described.

First Embodiment

First, an example of the configuration of a hyperspectral imaging system used in a first embodiment of the present disclosure will be described. Thereafter, an inspection system using the hyperspectral imaging system will be described.

Hyperspectral Imaging System

FIG. 1A is a diagram schematically illustrating an example of the configuration of the hyperspectral imaging system. This system includes an imaging apparatus 100 and a processing apparatus 200. The imaging apparatus 100 has substantially the same configuration as an imaging apparatus disclosed in International Publication No. 2020/080045. The imaging apparatus 100 includes an optical system 140, a filter array 110, and an image sensor 160. The optical system 140 and the filter array 110 are disposed along an optical path of incident light from an object 70, which is a subject. The filter array 110 is disposed between the optical system 140 and the image sensor 160.

FIG. 1A illustrates an apple as an example of the object 70. The object 70 is not limited to an apple, and may be any object that can be an inspection target. The image sensor 160 generates data of a compressed image 120, which is obtained by compressing information for wavelength bands into a two-dimensional monochrome image. The processing apparatus 200 generates image data for each of the wavelength bands included in a target wavelength range on the basis of the data of the compressed image 120 generated by the image sensor 160. This generated image data for the wavelength bands will be referred to as "hyperspectral image data" in this specification. In this case, suppose that the number of wavelength bands included in the target wavelength range is N (N is an integer greater than or equal to four). In the following description, the generated image data for the wavelength bands will be referred to as hyperspectral images $250W_1, 250W_2, \ldots, 250W_N$, and these images are collectively referred to as a hyperspectral image 250. In this specification, a signal representing an image, that is, a group of signals representing pixel values of pixels may be simply referred to as an "image".

The filter array 110 is an array of filters disposed in rows and columns and having translucency. The filters include different kinds of filters having different spectral transmittances from each other, that is, having different wavelength dependencies on luminous transmittance from each other. The filter array 110 modulates the intensity of incident light on a wavelength basis and outputs the resulting light. This process performed by the filter array 110 will be referred to as "encoding" in this specification.

In the example illustrated in FIG. 1A, the filter array 110 is disposed near or directly on the image sensor 160. In this case, "near" refers to the filter array 110 being close enough to the image sensor 160 that an image of light from the optical system 140 is formed on the surface of the filter array 110 in a state where the image of light has a certain degree of clearness. "Directly on" refers to the filter array 110 and the image sensor 160 being close to each other to an extent that there is hardly any gap therebetween. The filter array 110 and the image sensor 160 may be formed as a single device.

The optical system 140 includes at least one lens. In FIG. 1A, the optical system 140 is illustrated as one lens; however, the optical system 140 may be a combination of lenses. The optical system 140 forms an image on an imaging surface of the image sensor 160 through the filter array 110.

Figure 1B:
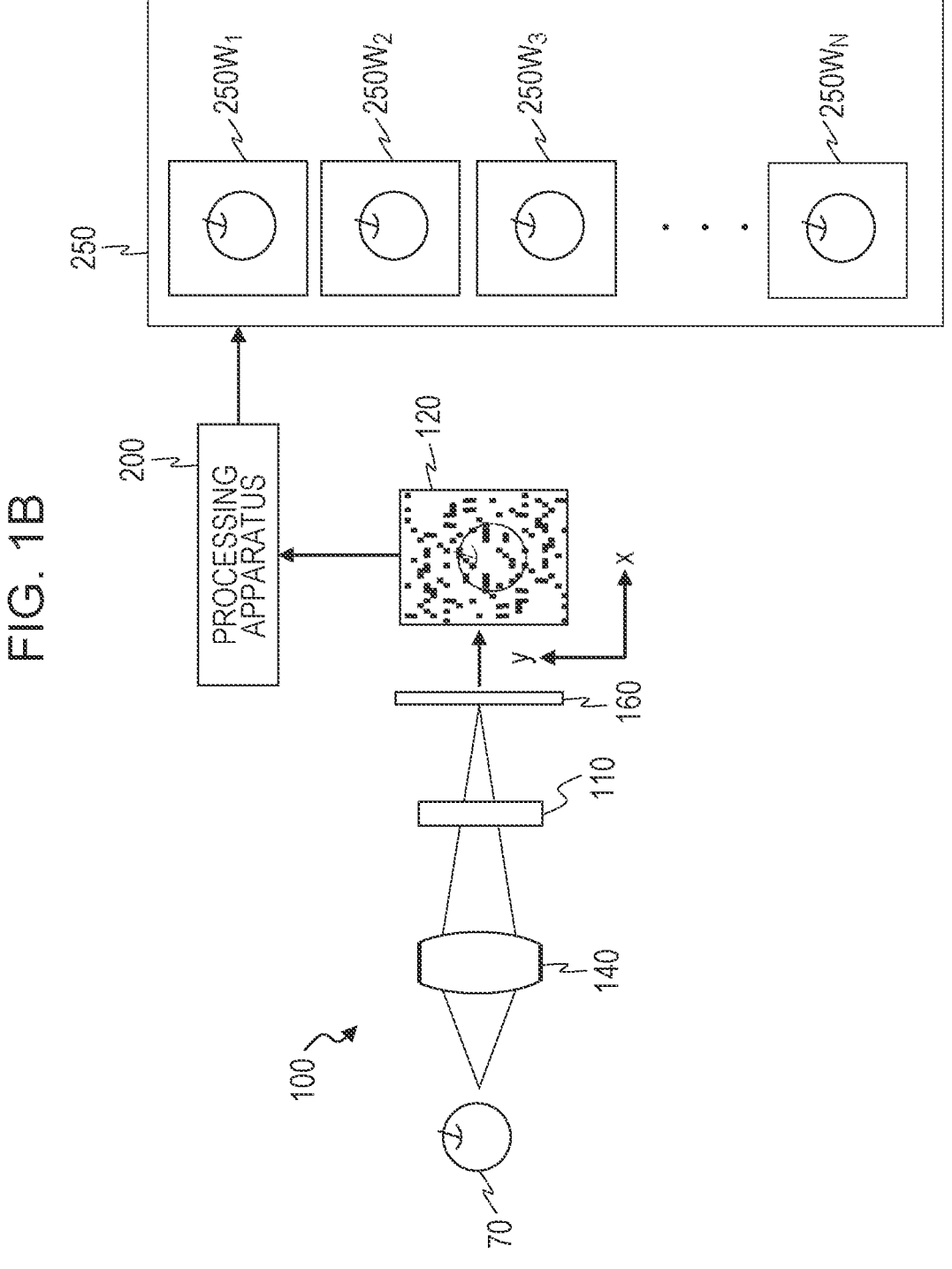
FIG. 1B is a diagram schematically illustrating another example of the configuration of the hyperspectral imaging system.
Figure 1C:
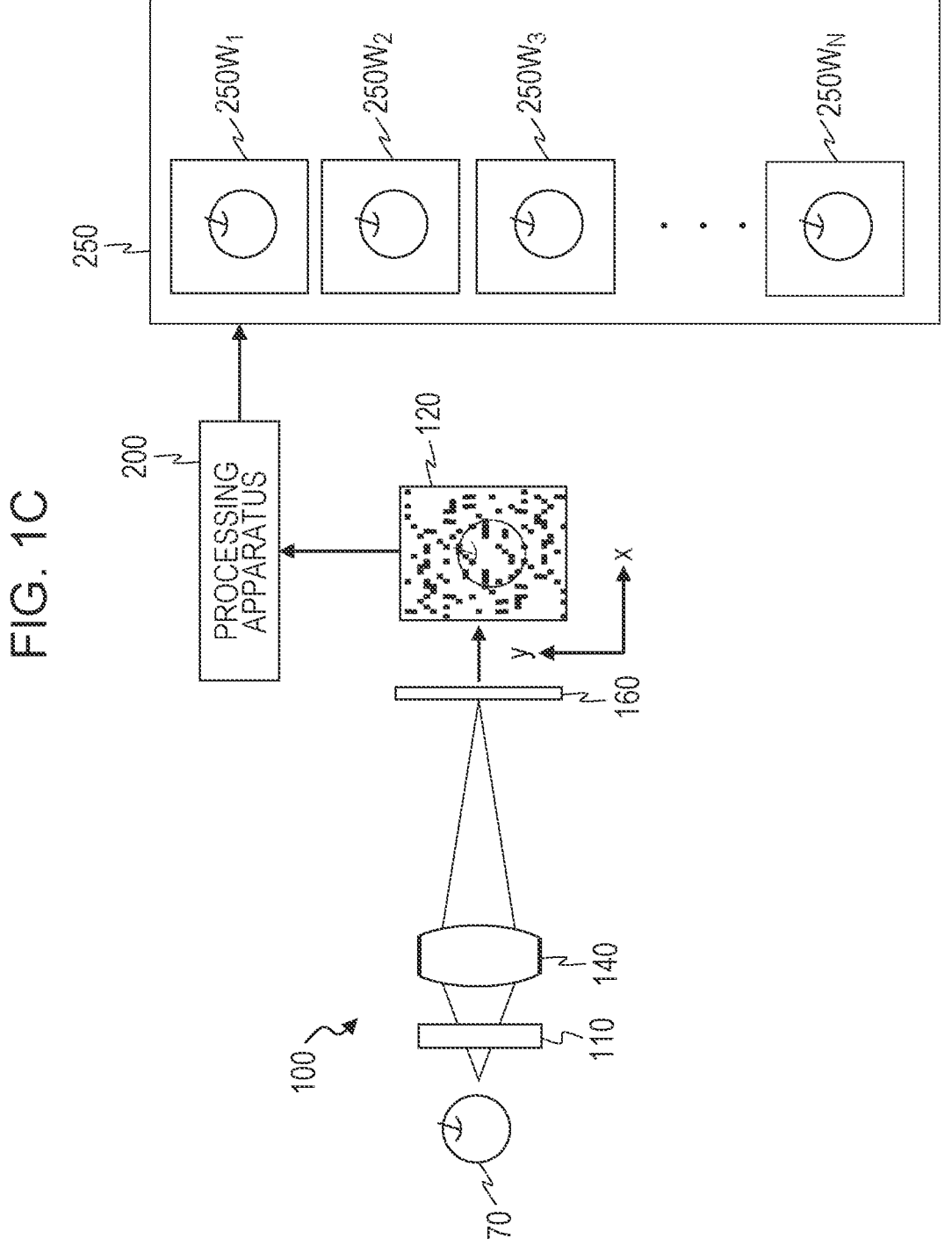
FIG. 1C is a diagram schematically illustrating yet another example of the configuration of the hyperspectral imaging system.
Figure 1D:
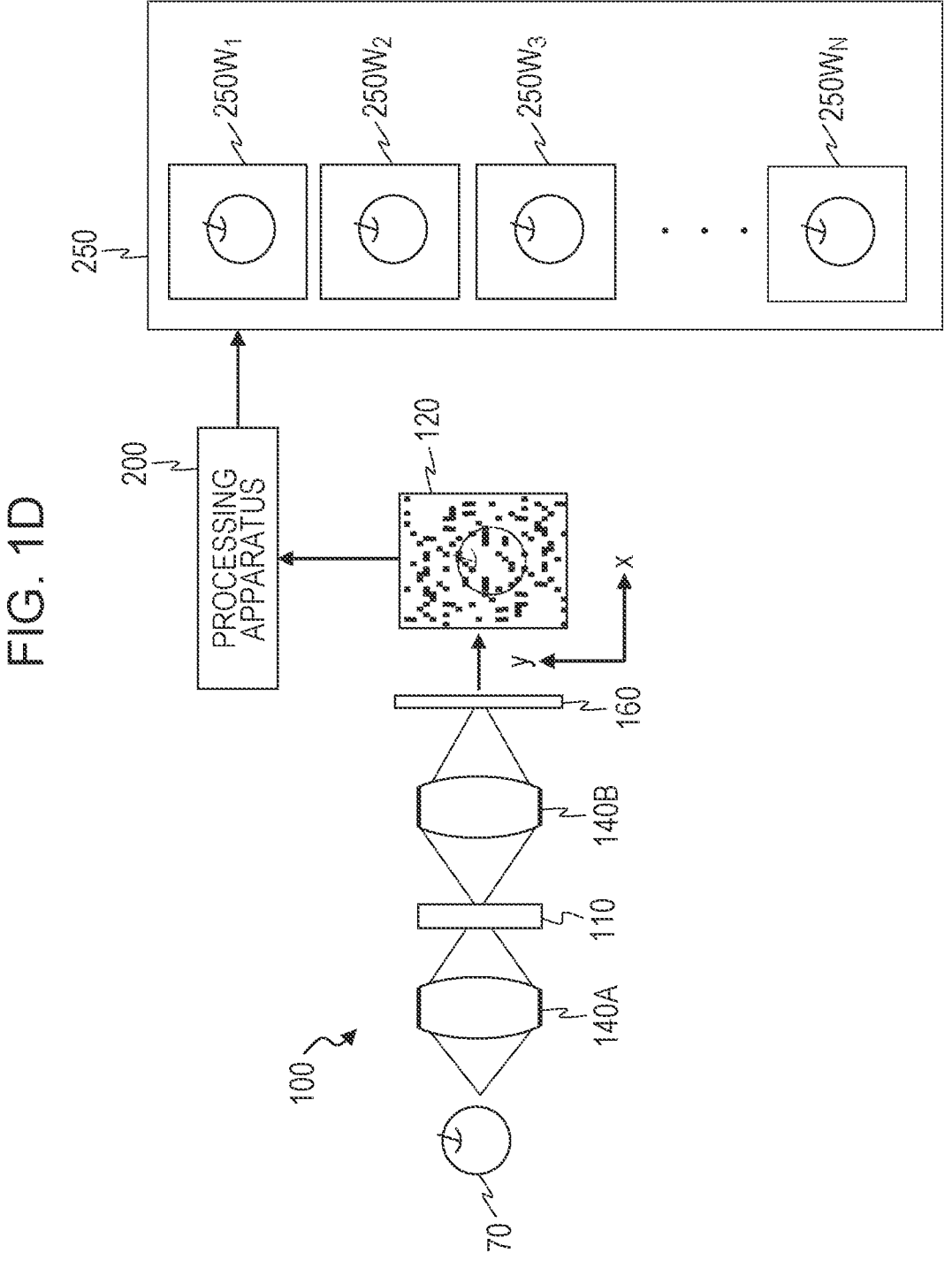
FIG. 1D is a diagram schematically illustrating yet another example of the configuration of the hyperspectral imaging system.

The filter array 110 may be disposed so as to be spaced apart from the image sensor 160. FIGS. 1B to 1D are diagrams illustrating examples of the configuration of the imaging apparatus 100, in which the filter array 110 is disposed so as to be spaced apart from the image sensor 160. In the example illustrated in FIG. 1B, the filter array 110 is disposed between the optical system 140 and the image sensor 160 and at a position spaced apart from the image sensor 160. In the example illustrated in FIG. 1C, the filter array 110 disposed between the object 70 and the optical system 140. In the example illustrated in FIG. 1D, the imaging apparatus 100 includes two optical systems 140A and 140B, and the filter array 110 is disposed between the optical systems 140A and 140B. As in these examples, an optical system including one or more lenses may be disposed between the filter array 110 and the image sensor 160. In FIGS. 1A to 1D, an image corresponding to a wavelength band $W_1$, that is, an image for the wavelength band $W_1$ is denoted by $250W_1, \ldots$, and an image corresponding to a wavelength band $W_N$, that is, an image for the wavelength band $W_N$ is denoted by $250W_N$.

The image sensor 160 is a monochrome light detector having light detection devices (also referred to as "pixels" in this specification) arranged two-dimensionally. The image sensor 160 may be, for example, a charge-coupled device (CCD), a complementary metal-oxide-semiconductor (CMOS) sensor, or an infrared array sensor. The light detection devices include, for example, a photodiode. The image sensor 160 is not necessarily a monochrome sensor. For example, a color sensor having R/G/B, R/G/B/IR, or R/G/B/W filters may be used. By using a color sensor, the amount of information regarding wavelengths can be increased, so that the generation accuracy of the hyperspectral image 250 can be increased. A wavelength range as an acquisition target may be freely determined. The wavelength range is not limited to the visible wavelength region and may also be the ultraviolet wavelength region, the near infrared wavelength region, the mid-infrared wavelength region, or the far-infrared wavelength region.

The processing apparatus 200 is a computer including a processor and a storage medium such as a memory. The processing apparatus 200 generates, on the basis of the compressed image 120 acquired by the image sensor 160, data of the images $250W_1, 250W_2, \ldots$, and $250W_N$ including information for the wavelength bands in a respective manner.

Figure 2A:
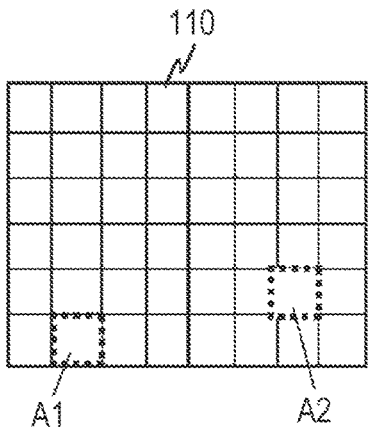
FIG. 2A is a diagram schematically illustrating an example of a filter array.

FIG. 2A is a diagram schematically illustrating an example of the filter array 110. The filter array 110 has regions arranged two-dimensionally. In this specification, these regions may be referred to as "cells". In each region, an optical filter having a spectral transmittance set individually is arranged. Spectral transmittance is expressed by a function $T(\lambda)$, where the wavelength of incident light is $\lambda$. The spectral transmittance $T(\lambda)$ may have a value greater than or equal to 0 and less than or equal to 1.

In the example illustrated in FIG. 2A, the filter array 110 has 48 rectangular regions arranged in 6 rows and 8 columns. This is merely an example, and a larger number of regions than this may be provided in actual applications. The number of regions may be about the same as, for example, the number of pixels of the image sensor 160. The number of filters included in the filter array 110 is determined in accordance with applications, for example, within a range from several tens to several tens of millions.

Figure 2B:
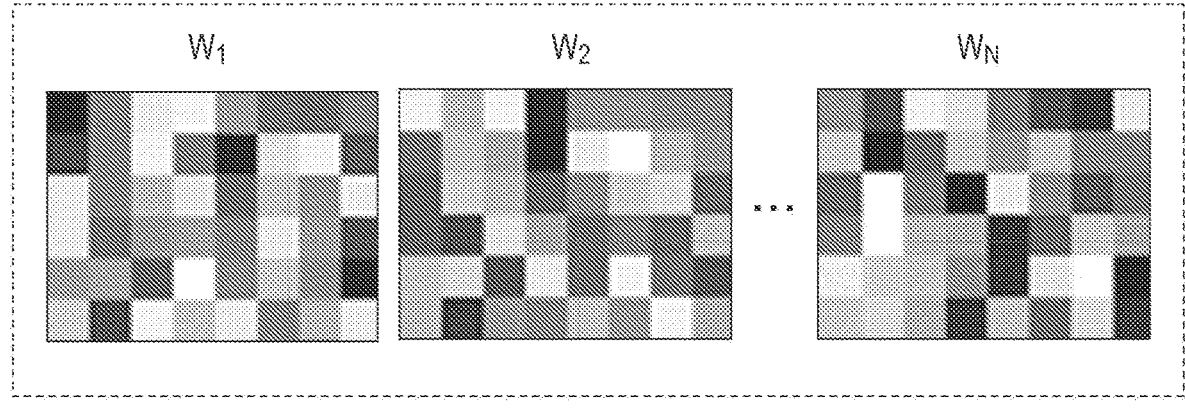
FIG. 2B is a diagram illustrating an example of a spatial distribution of luminous transmittance of each wavelength band included in a target wavelength range.

FIG. 2B is a diagram illustrating an example of a spatial distribution of luminous transmittance of each of the wavelength bands $W_1, W_2, \ldots, W_N$ included in the target wavelength range. In the example illustrated in FIG. 2B, differences in shading between the regions represent differences in transmittance. The lighter the shade of the region, the higher the transmittance. The darker the shade of the region, the lower the transmittance. As illustrated in FIG. 2B, the spatial distribution of luminous transmittance differs depending on a wavelength band basis.

Figure 2C:
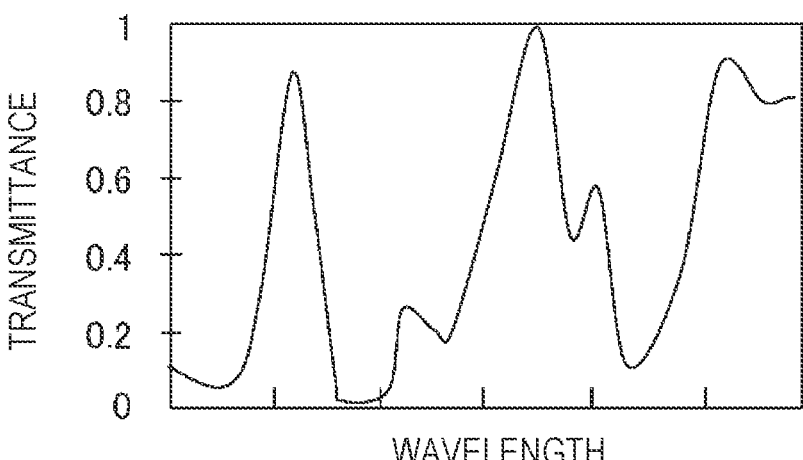
FIG. 2C is a diagram illustrating an example of the spectral transmittance of one region included in the filter array.
Figure 2D:
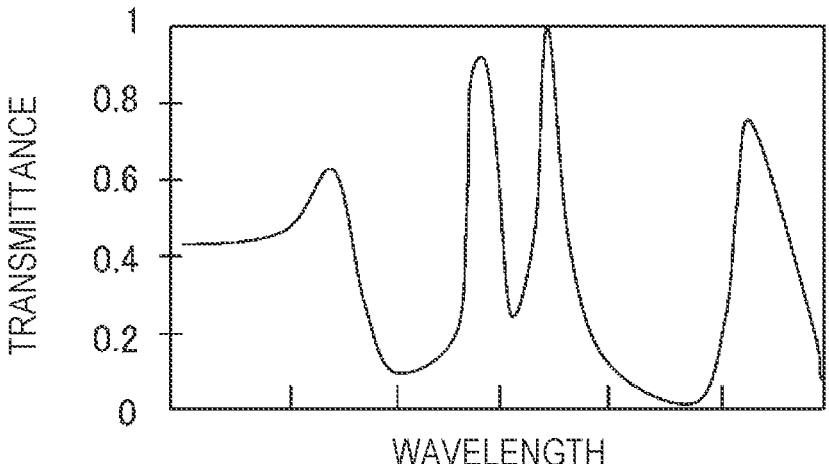
FIG. 2D is a diagram illustrating an example of the spectral transmittance of another region included in the filter array.

FIG. 2C is a diagram illustrating an example of the spectral transmittance of a region A1, and FIG. 2D is a diagram illustrating an example of the spectral transmittance of a region A2, the regions A1 and A2 being included in the filter array 110 illustrated in FIG. 2A. The spectral transmittance of the region A1 is different from that of the region A2. In this manner, the spectral transmittance of the filter array 110 differs on a region basis. Note that all the regions do not necessarily have different spectral transmittances from each other. At least some of the regions included in the filter array 110 have different spectral transmittances from each other. The filter array 110 includes two or more filters that have different spectral transmittances from each other. In one example, the number of patterns of spectral transmittances of the regions included in the filter array 110 may be the same as N, which is the number of wavelength bands included in the target wavelength range, or higher than N. The filter array 110 may be designed such that more than half of the regions have different spectral transmittances from each other.

Figure 3A:
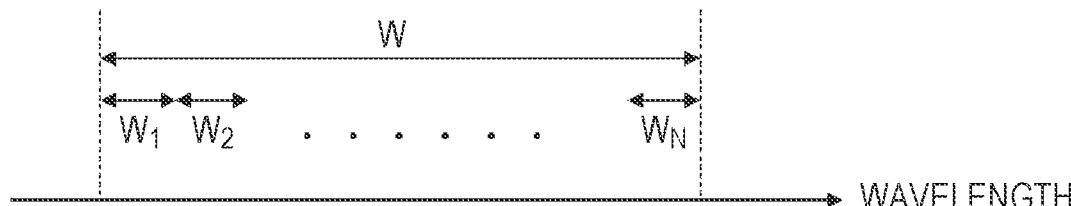
FIG. 3A is a diagram for describing relationships between a target wavelength range W and wavelength bands $W_1$, $W_2$, . . . , $W_N$ included in the target wavelength range W.
Figure 3B:
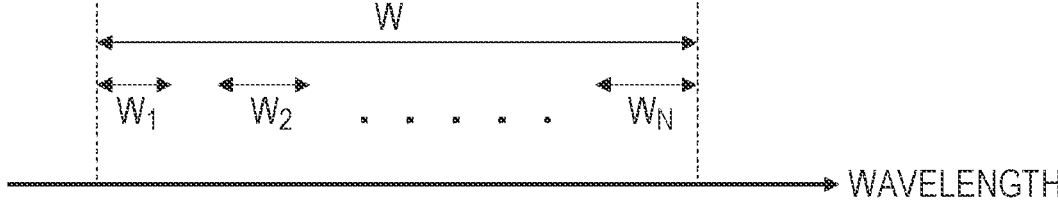
FIG. 3B is another diagram for describing relationships between the target wavelength range W and the wavelength bands $W_1$, $W_2$, . . . , $W_N$ included in the target wavelength range W.

FIGS. 3A and 3B are diagrams for describing relationships between a target wavelength range W and the wavelength bands $W_1$, $W_2$, . . . , $W_N$ included in the target wavelength range W. The target wavelength range W may be set to various ranges depending on applications. The target wavelength range W has, for example, a wavelength range of visible light of about 400 nm to about 700 nm, a wavelength range of near infrared rays of about 700 nm to about 2500 nm, or a wavelength range of near ultraviolet rays of about 10 nm to about 400 nm. Alternatively, the target wavelength range W may be a radio wave region for mid-infrared rays or far-infrared rays. In this manner, a wavelength region to be used is not limited to the visible light region. In this specification, not only visible light but also radiation in general including infrared rays and ultraviolet rays will be referred to as "light".

In the example illustrated in FIG. 3A, N is set to any integer greater than or equal to 4, the target wavelength range W is equally divided into N sections, and the N wavelength regions are referred to as the wavelength band $W_1$, the wavelength band $W_2$, . . . , and the wavelength band $W_N$. Note that the example is not limited to this one. The wavelength bands included in the target wavelength range W may be freely set. For example, the wavelength bands may have different bandwidths. There may be an overlap or a gap between adjacent wavelength bands among the wavelength bands. In the example illustrated in FIG. 3B, the wavelength bands have different bandwidths, and there is a gap between two adjacent wavelength bands among the wavelength bands. In this manner, the wavelength bands may be freely determined as long as the wavelength bands are different from each other.

Figure 4A:
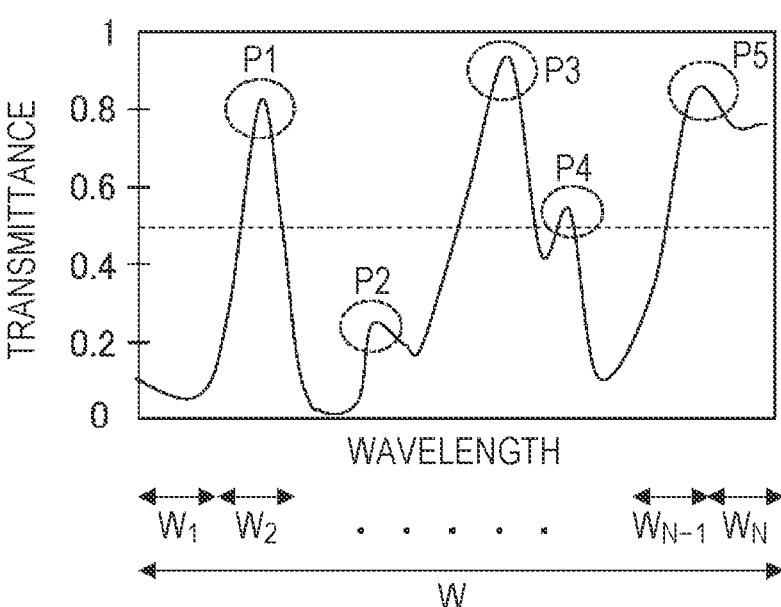
FIG. 4A is a diagram for describing characteristics of spectral transmittances of a certain region of the filter array.

FIG. 4A is a diagram for describing characteristics of the spectral transmittance of a certain region of the filter array 110. In the example illustrated in FIG. 4A, regarding wavelengths within the target wavelength range W, the spectral transmittance has local maxima P1 to P5 and minimum values. In the example illustrated in FIG. 4A, luminous transmittance within the target wavelength range W is normalized to have a maximum value of 1 and a minimum value of 0. In the example illustrated in FIG. 4A, the spectral transmittance has local maxima in wavelength ranges such as the wavelength band $W_2$ and the wavelength band $W_{N-1}$. In this manner, the spectral transmittance of each region of at least two wavelength ranges among the wavelength bands $W_1$ to $W_N$ has a local maximum. In the example illustrated in FIG. 4A, the local maxima P1, P3, P4, and P5 are greater than or equal to 0.5.

As described above, the luminous transmittance of each region varies with wavelength. Thus, the filter array 110 allows a large amount of a certain wavelength range component of incident light to pass therethrough but does not allow a large portion of another wavelength range component of incident light to pass therethrough. For example, the transmittance of light of k wavelength bands out of N wavelength bands may be greater than 0.5, and the transmittance of light of the other N-k wavelength ranges may be less than 0.5, where k is an integer that satisfies $2 \leq k < N$. If incident light is white light, which includes all the visible light wavelength components equally, the filter array 110 modulates, on a region basis, the incident light into light having discrete peaks in intensity for wavelengths and superposes and outputs light of these multiple wavelengths.

Figure 4B:
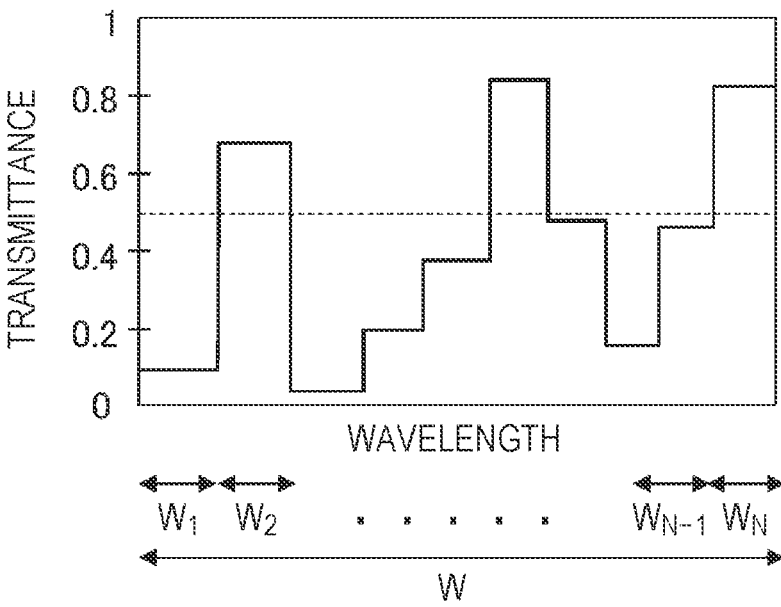
FIG. 4B is a diagram illustrating a result obtained by averaging spectral transmittances of each of the wavelength band $W_1$, the wavelength band $W_2$, . . . , and the wavelength band $W_N$ and illustrated in FIG. 4A.

FIG. 4B is a diagram illustrating, as one example, a result obtained by averaging spectral transmittances of each of the wavelength band $W_1$, the wavelength band $W_2$, . . . , and the wavelength band $W_N$, the spectral transmittances being illustrated in FIG. 4A. The average transmittance is obtained by integrating the spectral transmittance $T(\lambda)$ on a wavelength band basis and performing division using the bandwidth of each wavelength band. In this specification, the value of average transmittance for each wavelength band in this manner will be treated as the transmittance of the wavelength band. In this example, transmittance is prominently high in three wavelength ranges corresponding to the local maxima P1, P3, and P5. In particular, transmittance is higher than 0.8 in two wavelength ranges corresponding to the local maxima P3 and P5.

In the example illustrated in FIGS. 2A to 2D, a gray scale transmittance distribution is assumed in which the transmittance of each region may have any value greater than or equal to 0 and less than or equal to 1. However, a gray scale transmittance distribution is not always needed. For example, a binary scale transmittance distribution may be used in which the transmittance of each region may have either a value of around 0 or a value of around 1. In a binary scale transmittance distribution, each region allows a large portion of light of at least two wavelength ranges among the wavelength ranges included in the target wavelength range to pass therethrough, and does not allow a large portion of light of the other wavelength ranges to pass therethrough. In this case, the "large portion" refers to about 80% or more.

Some of all the cells, for example, half the cells may be replaced with transparent regions. Such transparent regions allow light of all the wavelength bands $W_1$ to $W_N$ included in the target wavelength range W to pass therethrough at similarly high transmittances, for example, 80% or higher. With such a configuration, the transparent regions are disposed, for example, in a checkerboard manner. That is, the regions whose luminous transmittance varies with wavelength and the transparent regions may be arranged in an alternating manner in two directions of the arrayed regions in the filter array 110.

Data representing such a spatial distribution of the spectral transmittance of the filter array 110 is acquired beforehand on the basis of design data or by performing actual measurement calibration, and is stored in a storage medium of the processing apparatus 200. This data is used in arithmetic processing to be described later.

The filter array 110 may be formed using, for example, a multi-layer film, an organic material, a diffraction grating structure, or a microstructure including metal. In a case where a multi-layer film is used, for example, a dielectric multilayer film or a multi-layer film including a metal layer may be used. In this case, the cells are formed such that at least the thicknesses, materials, or stacking orders of the layers of the multi-layer film are made different from cell to cell. As a result, spectral characteristics that are different from cell to cell can be realized. By using a multi-layer film, a sharp rising edge and a sharp falling edge can be realized for spectral transmittance. A configuration using an organic material can be realized by causing different cells to contain different pigments or dyes or by causing different cells to have different stacks of layers of materials. A configuration using a diffraction grating structure can be realized by causing different cells to have structures with different diffraction pitches or different depths. In a case where a microstructure including metal is used, the filter array 110 can be produced using plasmon effect spectroscopy.

Next, an example of signal processing performed by the processing apparatus 200 will be described. The processing apparatus 200 generates a hyperspectral image 250, which is a multiwavelength image, on the basis of the compressed image 120 output from the image sensor 160 and characteristics of a transmittance spatial distribution for each wavelength of the filter array 110. In this case, "multiwavelength" refers to, for example, more wavelength ranges than 3-color wavelength ranges, which are RGB wavelength ranges, acquired by a normal color camera. The number of such wavelength ranges may be, for example, any number between 4 and about 100. The number of such wavelength ranges will be referred to as the "number of bands". Depending on applications, the number of bands may exceed 100.

Before describing a "two-stage foreign object inspection operation" according to the present disclosure, a method for generating data of the hyperspectral image 250 from the compressed image 120 acquired by the image sensor 160 will be described. The data of the hyperspectral image 250 will be denoted by f. When the number of bands is N, f denotes data obtained by combining image data $f_1$ for the wavelength band $W_1$, image data $f_2$ for the wavelength band $W_2$, . . . , and image data $f_N$ for the wavelength band $W_N$. In this case, as illustrated in FIG. 1A, suppose that the horizontal direction of the image is the x direction, and the vertical direction of the image is the y direction. When the number of pixels in the x direction for the image data to be obtained is n, and the number of pixels in the y direction for the image data to be obtained is m, the image data $f_1$, the image data $f_2$, . . . , and the image data $f_N$ are each two-dimensional data having n×m pixels. Thus, the data f is three-dimensional data having n×m×N elements. This three-dimensional data will be referred to as "hyperspectral image data" or a "hyperspectral data cube". In contrast, data g of the compressed image 120 acquired by the filter array 110 through encoding and multiplexing has n×m elements. The data g can be expressed by the following Eq. (1).

$$g = Hf = H \begin{bmatrix} f_1 \\ f_2 \\ \vdots \\ f_N \end{bmatrix} \tag{1}$$

In this case, $f_1$, $f_2$, . . . , $f_N$ are each data having n×m elements. Thus, a vector on the right side is a one-dimensional vector having n×m×N rows and one column. A vector g is a one-dimensional vector having n×m rows and one column. A matrix H represents a conversion in which individual components $f_1$, $f_2$, . . . , $f_N$ of a vector f are encoded and intensity-modulated using encoding information (hereinafter also referred to as "mask information") that varies on a wavelength band basis, and are then added to each other. Thus, H denotes a matrix having n×m rows and n×m×N columns.

When the vector g and the matrix H are given, it seems that f can be calculated by solving an inverse problem of Eq. (1). However, the number of elements (n×m×N) of the data f to be obtained is greater than the number of elements (n×m) of the acquired data g, and thus this problem is an ill-posed problem, and the problem cannot be solved as is. Thus, the processing apparatus 200 uses the redundancy of the images included in the data f and uses a compressed-sensing method to obtain a solution. Specifically, the data f to be obtained is estimated by solving the following Eq. (2).

$$f' = \operatorname*{argmin}_{f} \{ \|g - Hf\|_{l_2} + \tau \Phi(f) \} \tag{2}$$

In this case, f' denotes estimated data of the data f. The first term in the braces of the equation above represents a shift between an estimation result Hf and the acquired data g, which is a so-called residual term. In this case, the sum of squares is treated as the residual term; however, an absolute value, a root-sum-square value, or the like may be treated as the residual term. The second term in the braces is a regularization term or a stabilization term. Eq. (2) means to obtain f that minimizes the sum of the first term and the second term. The processing apparatus 200 can cause a solution to converge through a recursive iterative operation and can calculate the final solution f'.

The first term in the braces of Eq. (2) refers to a calculation for obtaining the sum of squares of the differences between the acquired data g and Hf, which is obtained by converting f in the estimation process using the matrix H. The second term $\Phi(f)$ is a constraint for regularization of f and is a function that reflects sparse information regarding estimated data. This function provides an effect in that estimated data is smoothed or stabilized. The regularization term can be expressed using, for example, discrete cosine transformation (DCT), wavelet transform, Fourier transform, or total variation (TV) of f. For example, in a case where total variation is used, stabilized estimated data can be acquired in which the effect of noise of the data g, observation data, is suppressed. The sparsity of the object 70 in a space of the regularization term differs with the texture of the object 70. A regularization term having a regularization term space in which the texture of the object 70 becomes sparser may be selected. Alternatively, regularization terms may be included in calculation. τ is a weighting factor. The greater the weighting factor τ, the greater the amount of reduction of redundant data, thereby increasing a compression rate. The smaller the weighting factor τ, the lower the convergence to the solution. The weighting factor τ is set to an appropriate value with which f is converged to a certain degree and is not compressed too much.

Note that, in the configurations illustrated in FIGS. 1B and 1C, images encoded by the filter array 110 are acquired in blurred states on the imaging surface of the image sensor 160. Thus, the hyperspectral image 250 can be generated by reflecting the blurring information in the above-described matrix H, the blurring information being stored in advance. In this case, the blurring information is expressed by a point spread function (PSF). The PSF is a function that defines the degree of spread of a point image to surrounding pixels. For example, in a case where a point image corresponding to one pixel on an image is blurred and spread to a region of k×k pixels around the pixel, the PSF can be defined as a group of factors, that is, a matrix indicating the effect on the luminance of each pixel in the region. The effect of blurring of an encoding pattern by the PSF is reflected in the matrix H, so that the hyperspectral image 250 can be generated. The filter array 110 may be disposed at any position; however, a position may be selected where the encoding pattern of the filter array 110 does not spread so much as to disappear.

Through the above-described processing, the hyperspectral image 250 can be generated from the compressed image 120 acquired by the image sensor 160. In the above-described example, the processing apparatus 200 generates the hyperspectral image 250 by applying an algorithm using a compressed sensing principle to all the wavelength bands included in the target wavelength range. In this case, the higher the resolution of the compressed image 120, the higher the calculation load for generating the hyperspectral image 250, thereby requiring a longer time for inspection.

Thus, in the present embodiment, the calculation load and time required for the entire inspection will be reduced by performing the following two-stage reconstruction and inspection. At the first stage, the above-described reconstruction calculation is performed only for a first band group including not all the bands but a relatively small number of bands, and an image for each band is generated from a compressed image. On the basis of the images for the relatively small number of bands, first foreign object regions where a specific foreign object is highly likely to be present are specified in the images. At the second stage, regarding relatively small regions that include the specified first foreign object regions, the above-described reconstruction calculation is performed only for a second band group, which includes a larger number of bands than the first band group. As a result, second foreign object regions, in which the specific foreign object to be detected is present, are specified from among the first foreign object regions. Information regarding the specified second foreign object regions is output to an output apparatus such as a display.

By performing such a method, a specific foreign object included in an inspection target can be detected with fewer calculations. As a result, the time required for the inspection process can be significantly reduced.

In the following, an example of the configuration and operation of an inspection system based on the above-described method will be described in more detail.

Inspection System

Figure 5:
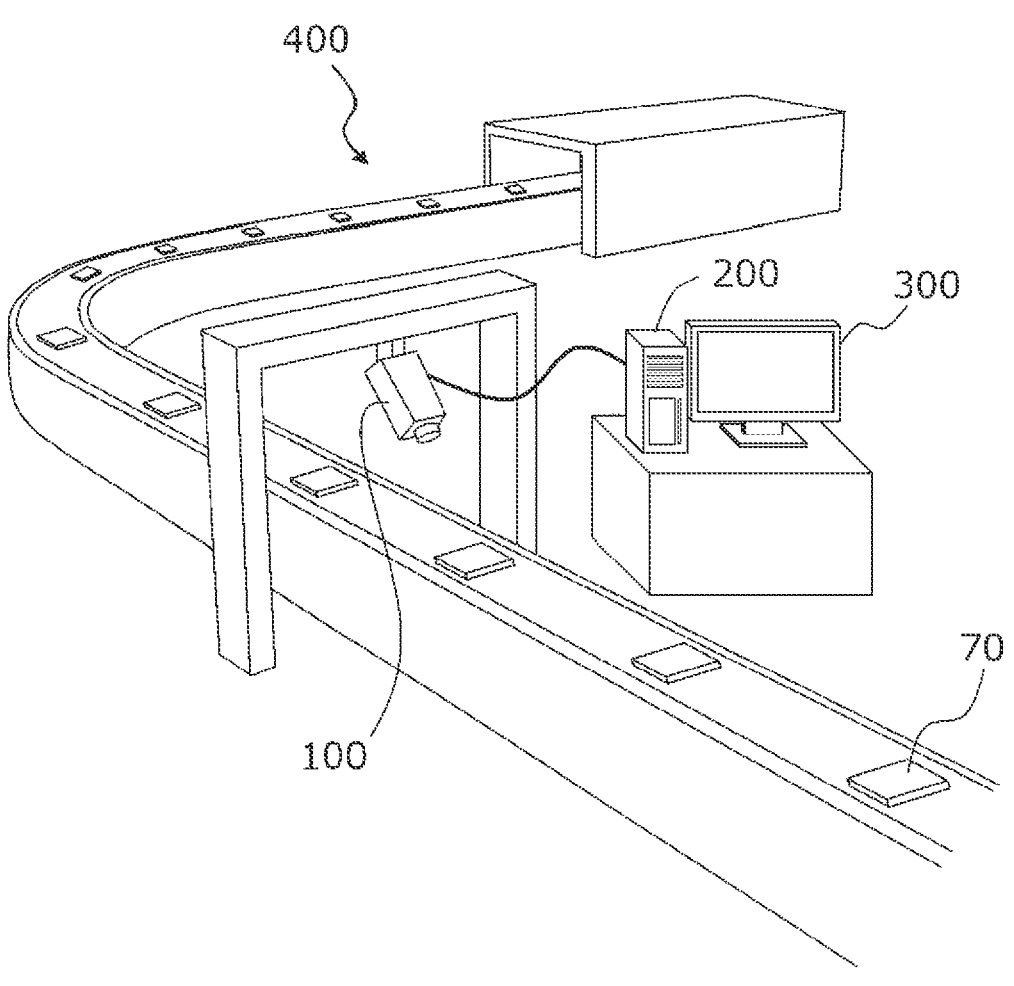
FIG. 5 is a diagram schematically illustrating an example of the configuration of an inspection system according to a first embodiment.

FIG. 5 is a diagram schematically illustrating an example of the configuration of an inspection system according to the present embodiment. This inspection system includes the imaging apparatus 100, the processing apparatus 200, an output apparatus 300, and an actuator 400. The output apparatus 300 may include devices such as a display, a speaker, and a lamp. The actuator 400 may include devices such as a conveyor belt and a picking apparatus.

Objects 70 serving as inspection targets are placed on the conveyor belt and transported. Each object 70 is, for example, any item such as an industrial product or a food. The inspection system performs an operation for detecting, on the basis of a compressed image of the object 70, a foreign object that is contained in the object 70. A foreign object to be detected may be any object such as a specific metal, a plastic, an insect, dust, or a hair. A foreign object is not limited to these objects and may be quality-deteriorated part of the object 70. For example, in a case where the object 70 is a food, rotten part of the food may be detected as a foreign object. In a case where the inspection system detects a foreign object, the inspection system can output information indicating detection of a foreign object to the output apparatus 300 or remove, using the picking apparatus, the object 70 that includes the foreign object.

The imaging apparatus 100 is a camera that can perform hyperspectral imaging described above. The imaging apparatus 100 generates compressed images as described above by imaging the objects 70 continuously flowing on the conveyor. The processing apparatus 200 is any computer such as, for example, a personal computer, a server computer, or a laptop computer. The processing apparatus 200 generates an image for each of the bands by performing the above-described reconstruction calculation on the basis of a compressed image generated by the imaging apparatus 100. The processing apparatus 200 performs an operation for detecting, on the basis of the images for these bands, a foreign object contained in the object 70 and outputs a detection result to the output apparatus 300.

Figure 6:
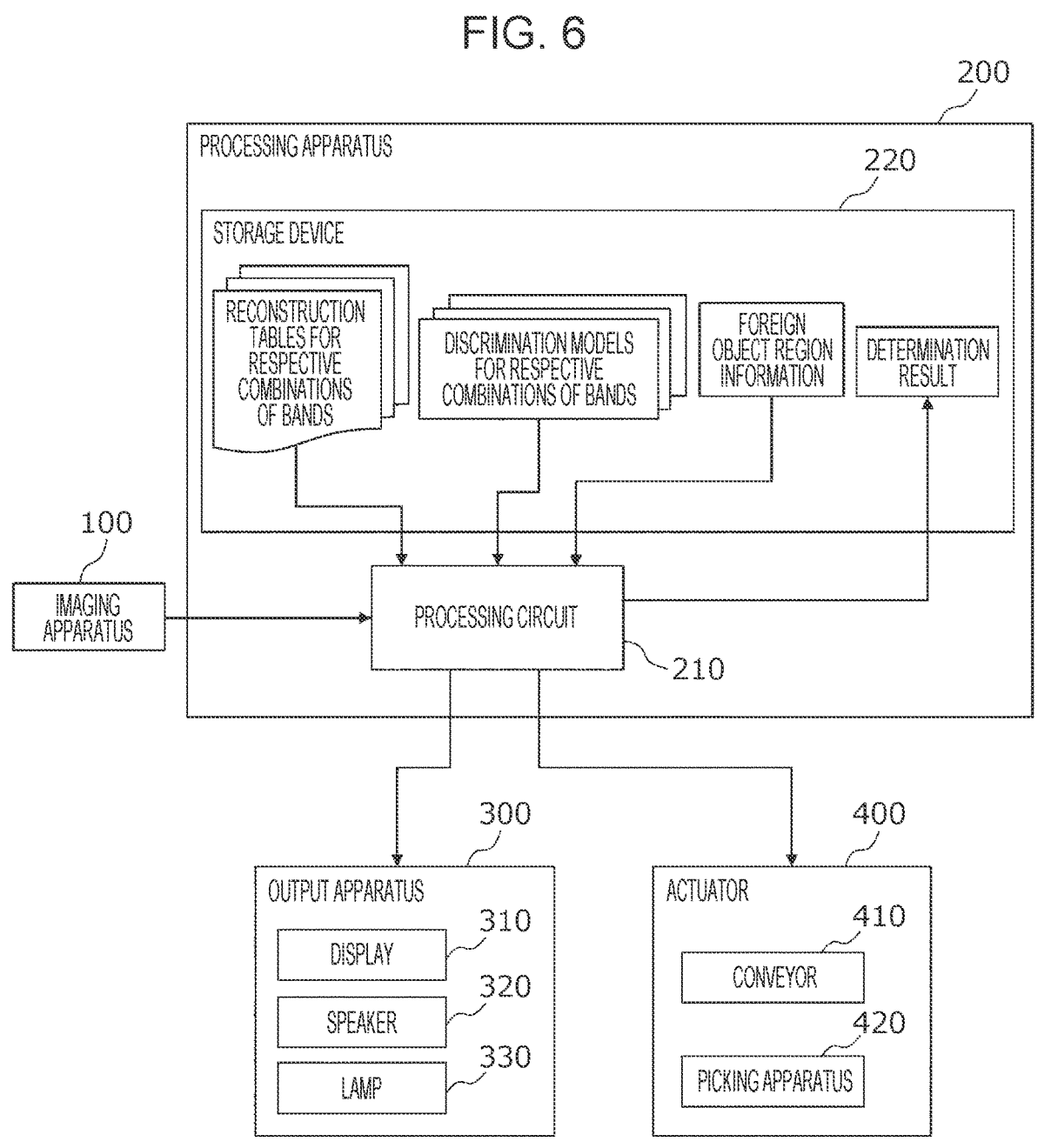

FIG. 6 is a block diagram illustrating an example of the configuration of the inspection system. The processing apparatus 200 includes a processing circuit 210 and a storage device 220. The output apparatus 300 includes a display 310, a speaker 320, and a lamp 330. The actuator 400 includes a conveyor 410 and a picking apparatus 420.

The imaging apparatus 100 includes an image sensor, a filter array, and an optical system such as a lens as described with reference to FIGS. 1A to 1D. The imaging apparatus 100 images the object 70, generates data of a compressed image, and sends the data to the processing apparatus 200.

The processing apparatus 200 generates an image for each band on the basis of the compressed image generated by the imaging apparatus 100. The processing circuit 210 of the processing apparatus 200 includes a processor such as, for example, a central processing unit (CPU) or a graphics processing unit (GPU). The processing circuit 210 determines, on the basis of the compressed image generated by the imaging apparatus 100, whether the object 70 includes a specific foreign object, and outputs information representing the determination result.

The processing circuit 210 performs two-stage reconstruction processing on the compressed image acquired from the imaging apparatus 100. In the first-stage reconstruction, reconstruction of the entire compressed image is performed only for a relatively small number of bands among the bands included in the target wavelength range. This relatively small number of bands is referred to as a first band group. The number of bands included in the first band group is any number greater than or equal to one, and is greater than or equal to two and less than or equal to five in one example. In this reconstruction processing, the processing circuit 210 uses a first reconstruction table including only information regarding matrix elements corresponding to the first band group and included in the matrix H in the above-described Eqs. (1) and (2). In this case, a synthetic reconstruction table obtained by combining information regarding matrix elements corresponding to bands different from the bands included in first band group may be used to generate a synthetic reconstructed image corresponding to the bands different from the bands included in the first band group. The processing circuit 210 reconstructs an image for each band of the first band group on the basis of the compressed image and the first reconstruction table in accordance with the above-described Eq. (2). The processing circuit 210 first specifies, in accordance with a discrimination model based on a first condition, a first foreign object region from pixel values of pixels included in reconstructed images corresponding to the individual bands, the first foreign object region being a region where a foreign object is highly likely to be present. The first condition may be, for example, that the pixel region is constituted by contiguous pixels whose pixel values for the first band group satisfy a predetermined condition and that the pixel region has a size exceeding a predetermined size. The processing circuit 210 causes the storage device 220 to store the first foreign object region and performs reconstruction of a relatively small region including the first foreign object region for each band of the second band group, which includes a larger number of bands than the first band group. In this reconstruction processing, the processing circuit 210 uses a second reconstruction table including only information regarding matrix elements corresponding to the second band group and included in the matrix H in the above-described Eqs. (1) and (2). The second band group may include all the bands of the target wavelength range. The processing circuit 210 calculates pixel values of pixels of a region corresponding to the first foreign object region included in the image for each band of the second band group, on the basis of the compressed image and the second reconstruction table and in accordance with the above-described Eq. (2). The processing circuit 210 specifies, in accordance with a discrimination model based on a second condition, a second foreign object region from the pixel values of the pixels of the region corresponding to the first foreign object region included in the image for each band, and causes the storage device 220 to store information representing the specified second foreign object region as a detection result, the second foreign object region being a region that includes a specific foreign object. The second condition may be, for example, that the region is classified into any one of preset classification lists on the basis of pixel values for the second band group. In a case where a foreign object that satisfies the second condition is detected, the processing circuit 210 transmits a control signal to the output apparatus 300 and the actuator 400, which are external devices. The output apparatus 300 causes at least one of the display 310, the speaker 320, or the lamp 330 to output a warning such as light, an image, a message, a beep, or a voice message in response to the received control signal. The actuator 400 may switch the path of the conveyor 410 or remove, using the picking apparatus 420, an object 70 having a detected foreign object from the conveyor 410 in response to the received control signal.

The storage device 220 includes any storage device such as a semiconductor memory, a magnetic storage device, or an optical storage device. The storage device 220 stores a computer program that the processing circuit 210 executes, data that the processing circuit 210 uses in a processing process, and data generated by the processing circuit 210 in the processing process. The storage device 220 stores, for example, data of compressed images generated by the imaging apparatus 100, reconstruction tables corresponding to respective combinations of bands such as the first band group and the second band group, discrimination models corresponding to the respective combinations of bands, information representing positions of the detected first foreign object region and the detected second foreign object region on images, and information representing a foreign object determination result.

Figure 7:
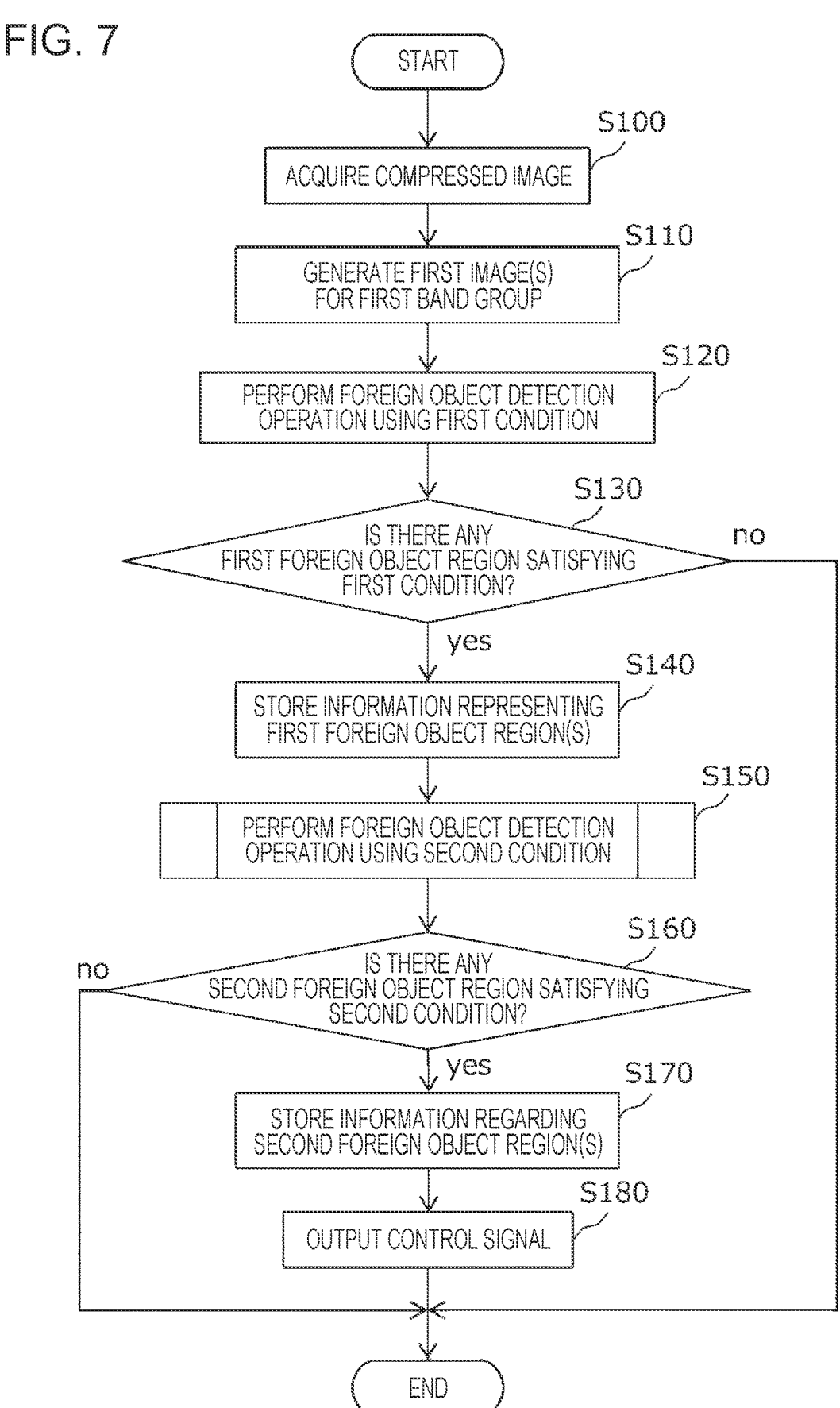
FIG. 7 is a flow chart illustrating an example of a two-stage foreign object detection operation performed by a processing circuit.

FIG. 7 is a flow chart illustrating an example of a two-stage foreign object detection operation performed by the processing circuit 210. In this example, the processing circuit 210 performs an operation from Step S100 to Step S180. First, the processing circuit 210 acquires a compressed image of the object 70, the compressed image being generated by the imaging apparatus 100 performing compressed sensing imaging (Step S100). Next, the processing circuit 210 performs, using the first reconstruction table corresponding to the first band group, a reconstruction calculation based on the above-described Eq. (2) to generate, for the first band group, one or more images of the object 70 from the compressed image (Step S110). The processing circuit 210 applies a first discrimination model based on the first condition to the generated one or more images to perform an operation for detecting a first foreign object region that satisfies the first condition (Step S120). In this case, the number of types of foreign object detected in accordance with the first discrimination model is one or more. The processing circuit 210 may detect two or more different types of foreign object in accordance with the first discrimination model. The processing circuit 210 determines whether a first foreign object region that satisfies the first condition is present (Step S130). In a case where a first foreign object region is present, the process proceeds to Step S140. In a case where a first foreign object region is not present, the process ends. The processing circuit 210 causes the storage device 220 to store information representing the detected first foreign object region (Step S140). Next, the processing circuit 210 performs, for the detected first foreign object region, foreign object detection processing using a second condition on the basis of information regarding the second band group, which includes a larger number of bands than the first band group (Step S150). In this case, the number of types of foreign object that satisfy the second condition is one or more and may be two or more. The number of types of foreign object that satisfy the second condition is smaller than the number of types of foreign object that satisfy the first condition. The number of types of foreign object that satisfy the first condition but does not satisfy the second condition may be one or more. The processing circuit 210 determines whether a second foreign object region that satisfies the second condition is present (Step S160). In a case where a second foreign object region is present, the process proceeds to Step S170. In a case where a second foreign object region is not present, the process ends. In a case where a second foreign object region is present, the processing circuit 210 causes the storage device 220 to store information regarding the second foreign object region (Step S170). The processing circuit 210 outputs a control signal to the output apparatus 300 and the actuator 400 (Step S180). Upon receiving the control signal from the processing circuit 210, the output apparatus 300 causes, for example, the display 310 to display a warning. Upon receiving the control signal from the processing circuit 210, the actuator 400 controls, for example, the conveyor 410 and the picking apparatus 420.

Figure 8:
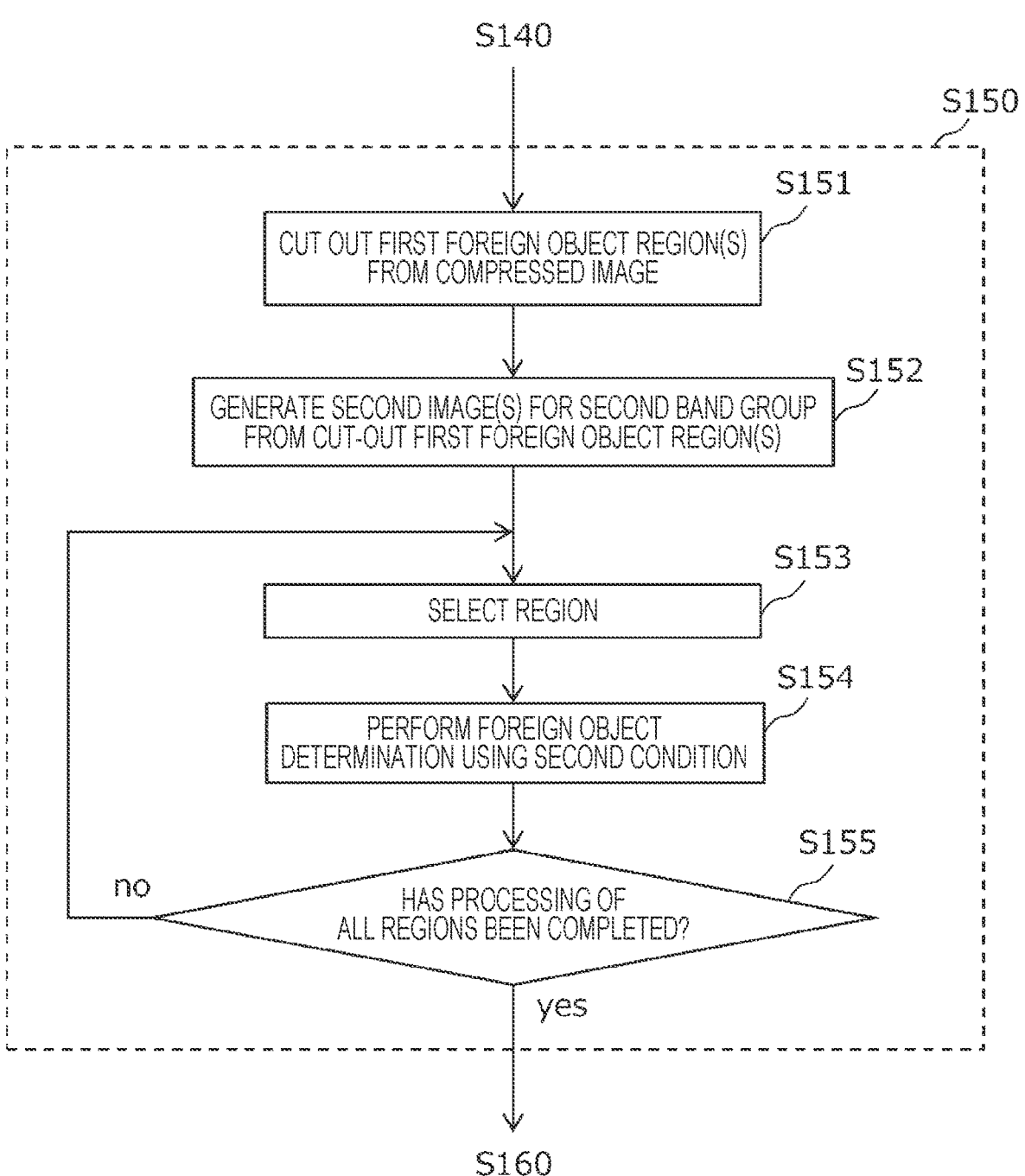
FIG. 8 is a flow chart illustrating details of foreign object detection processing using a second condition in Step S150.

FIG. 8 is a flow chart illustrating details of the foreign object detection processing using the second condition in Step S150. Step S150 includes Steps S151 to S155 illustrated in FIG. 8. One or more first foreign object regions may be detected from the compressed image in accordance with the discrimination model based on the first condition. After the position of each first foreign object region on the image is recorded in the storage device 220 in Step S140, the processing circuit 210 cuts out the one or more first foreign object regions from the compressed image (Step S151). The processing circuit 210 performs, for the one or more cut-out first foreign object regions, a reconstruction calculation based on the above-described Eq. (2) using the second reconstruction table corresponding to the second band group to generate second images for the second band group (Step S152). Next, the processing circuit 210 selects an unprocessed region from among the one or more first foreign object regions (Step S153). The processing circuit 210 applies a second discrimination model based on the second condition to the selected first foreign object region, and determines whether the selected first foreign object region satisfies the second condition (Step S154). The processing circuit 210 causes the storage device 220 to store the determination result. Next, the processing circuit 210 determines whether processing of all the first foreign object regions has been completed (Step S155). In a case where an unprocessed region is left, the process returns to Step S153. Until processing of all the first foreign object regions is completed, processing from Step S153 to S155 is repeated. When processing of all the first foreign object regions is completed, the process proceeds to Step S160.

FIG. 9 is a diagram illustrating an example of information stored by the storage device 220. In this example, the processing circuit 210 performs an operation for detecting particles of two types of metal (a metal 1 and a metal 2) as foreign objects. In a case where the processing circuit 210 detects particles of the metal 1, the processing circuit 210 causes the output apparatus 300 to issue a warning. Data of compressed images obtained through compressed sensing imaging are numbered (inspection sample Nos.) on an inspection sample basis and are each recorded together with information regarding the acquisition date and time of the compressed image. In this example, the metal 1 and the metal 2 are detected as foreign objects on the basis of the discrimination model based on the first condition. The metal 1 and the metal 2 are distinguished from each other and detected on the basis of the discrimination model based on the second condition. In this example, in a case where the metal 1 is detected, a warning is issued.

Figure 10:
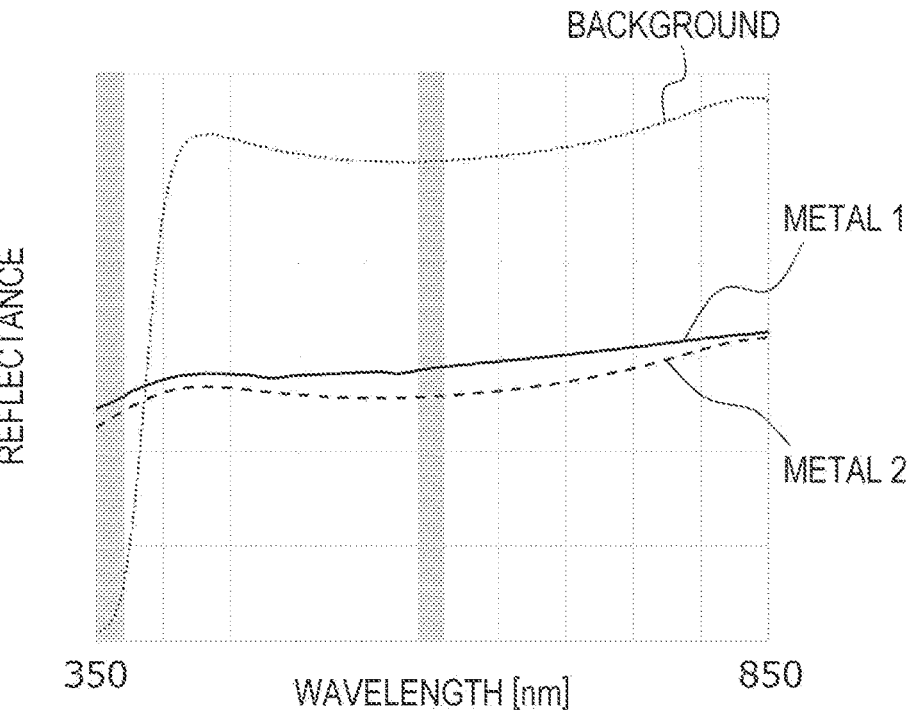
FIG. 10 is a diagram illustrating an example of the reflection spectra of two kinds of metal and a background and an example of a first band group.

FIG. 10 is a diagram illustrating an example of the first band group used when a foreign object detection operation using the first condition is performed. In FIG. 10, two wavelength ranges that represent the first band group are illustrated in gray. In FIG. 10, examples of reflection spectra of two types of foreign object (that is, the metal 1 and the metal 2) and a reflection spectrum of the background are also illustrated. In this example, the processing circuit 210 discriminates the two types of foreign object and the background from each other by comparing, on a pixel basis, reflectances in the two illustrated bands. Note that, in this example, the first band group includes two bands, which are 350 nm±10 nm and 600 nm±10 nm; however, these are merely examples. The first band group includes bands that are selected appropriately in accordance with an inspection target. The number of bands included in the first band group is any number greater than or equal to one, and may be greater than or equal to three. FIG. 10 illustrates a wavelength range of from 350 nm to 850 nm; however, other wavelength ranges may also be used.

Figure 11:
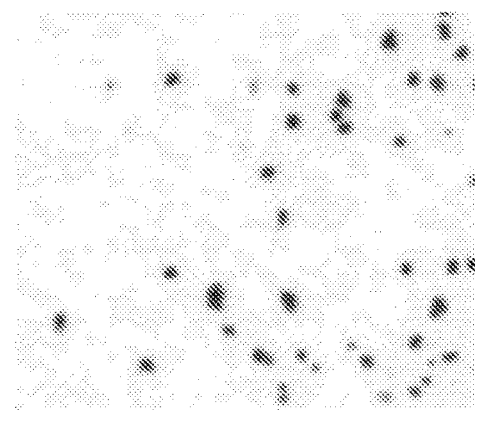
FIG. 11 is a diagram illustrating an example of an image generated on a band basis by performing a reconstruction calculation using a reconstruction table corresponding to the first band group.

FIG. 11 is a diagram illustrating an example of an image of the band (600 nm±10 nm) near the center of the graph illustrated in FIG. 10 among the images generated for the respective bands by performing a reconstruction calculation using the reconstruction table corresponding to the first band group. This image reflects the distribution of reflectance of a subject, and the brightness of the image varies with reflectance. Regions with higher reflectance are displayed lighter, and regions with lower reflectance are displayed darker. In this example, black granular regions in the image correspond to foreign objects, and the light region corresponds to the background. The discrimination model based on the first condition is a model used for detecting a foreign object on the basis of the size of a contiguous pixel region where pixel values for the first band group satisfy a predetermined condition. In a case where the first band group includes two bands as illustrated in FIG. 10, the predetermined condition may be, for example, that the ratio between pixel values for the two bands is included in a predetermined range. In the example illustrated in FIG. 10, the reflectances of the two types of foreign object are alike in any of the bands; however, the reflectances of the backgrounds for the two bands significantly differ from each other. Thus, whether a pixel of interest is a foreign object or the background can be determined in accordance with whether the ratio between pixel values for the two bands is, for example, in a range of greater than or equal to 0.8 and less than or equal to 1.2. In a case where the first band group includes one band, the predetermined condition may be that a pixel value for one band is greater or less than a certain threshold. In a case where the first band group includes three or more bands, the predetermined condition may be that, in a case where a reference band serving as a reference is set among the three or more bands, the ratio between a pixel value for each of the bands other than the reference band and a corresponding pixel value for the reference band is calculated, and the calculated ratios are included in a predetermined range. In this manner, a contiguous pixel region where values (for example, ratios) calculated on the basis of pixel values of pixels corresponding to the individual bands included in the first band group are included in a predetermined range can be detected as a region where a foreign object is likely to be present. The first condition may be, for example, that the diameter of a circumcircle of the continuous pixel region detected in this manner is greater than or equal to a threshold. In the example illustrated in FIG. 9, a pixel region whose circumcircle has a diameter greater than or equal to 1 mm is detected as a region where a foreign object (that is, the metal 1 or the metal 2) is present. The condition for discrimination is not limited to a condition based on the ratio between reflectances between wavelength bands, and may be a condition based on differences or may also be a condition derived through machine learning.

The processing circuit 210 assigns an ID to each foreign object region detected in accordance with the first condition, and causes the storage device 220 to record the position of the foreign object region on the image. The recorded position of the foreign object region may be a representative position such as the center or barycenter of the foreign object region. A foreign object region detected in this manner is referred to as a "first foreign object region". First foreign object regions may be detected at positions in accordance with the number of foreign objects.

The processing circuit 210 cuts out one or more detected first foreign object regions from the compressed image. For each cut-out foreign object region, the processing circuit 210 performs foreign object determination processing regarding the metal 1 and the metal 2 in accordance with the discrimination model based on the second condition and causes the storage device 220 to store the determination result (for example, the type of foreign object).

Figure 12:
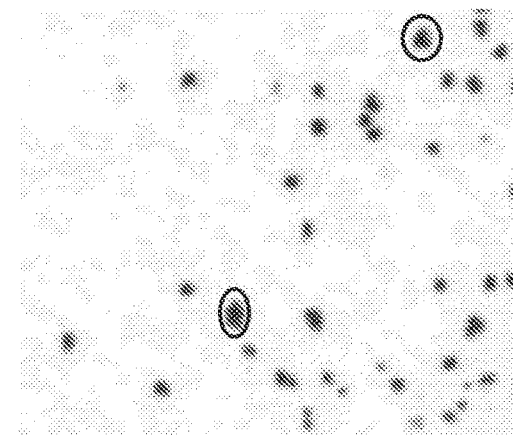
FIG. 12 is a diagram illustrating an example of first foreign object regions cut out in the example illustrated in FIG. 11.

FIG. 12 is a diagram illustrating an example of the first foreign object regions cut out in the example illustrated in FIG. 11. In FIG. 12, only two regions corresponding to the metal 1 among the cut-out first foreign object regions are expressed with circles. Similarly, one or more foreign object regions corresponding to the metal 2 will also be cut out. In this example, circular regions are cut out; however, rectangular regions may be cut out. For each of the cut-out first foreign object regions, the processing circuit 210 generates images for the respective bands using the reconstruction table corresponding to the second band group.

Figure 13:
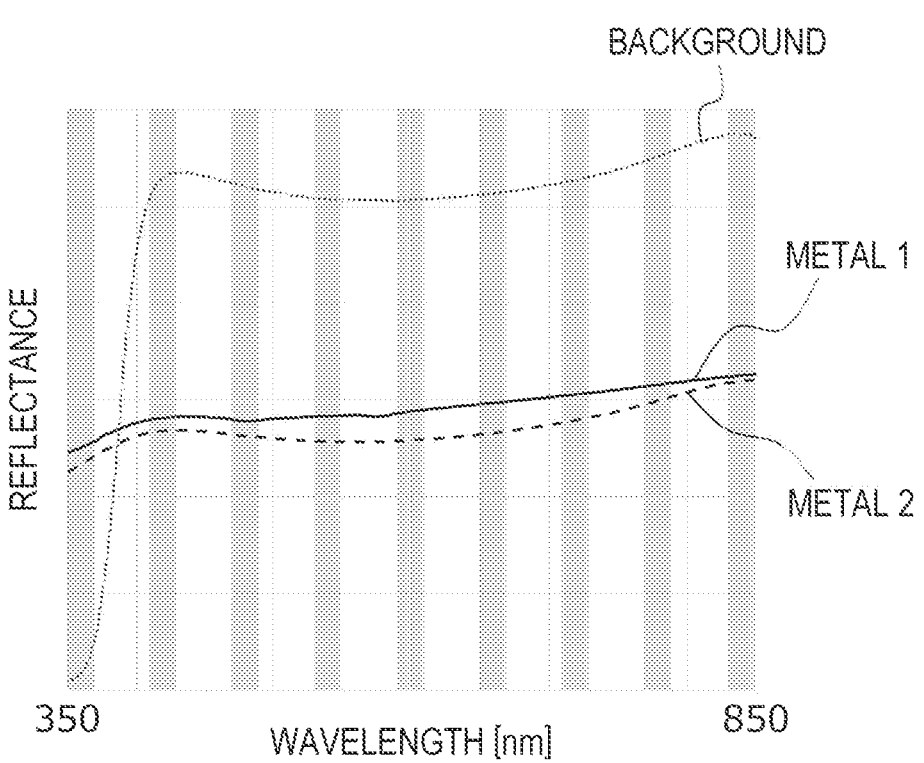
FIG. 13 is a diagram illustrating an example of the reflection spectra of the two kinds of metal and the background and an example of a second band group.

FIG. 13 is a diagram illustrating an example of the second band group in a foreign object detection operation using the second condition. In FIG. 13, wavelength ranges displayed in gray correspond to the second band group. The second band group in this example includes nine bands. By comparing the reflectances of the nine bands, the metal 1 and the metal 2 can be discriminated from each other. A condition for discrimination may be a condition as to whether, for example, the ratio or difference between pixel values between bands is in a predetermined range or a condition derived through machine learning.

Specifically, in a case where the second band group includes nine bands, when the shortest wavelength band among the nine bands is treated as Band 1 and the longest wavelength band among the nine bands is treated as Band 9, pixel values in Band 9 are treated as references, and the ratio of a pixel value for each of Bands 1 to 8 to a corresponding one of the references is obtained, and a determination may be made on the basis of the ratios. In this example, a discrimination condition may be that the ratio for the metal 1 is about the same as that for the metal 2 in Band 2, and that the ratio for the metal 2 is lower than that for the metal 1 in Bands 4 to 7.

More specifically, in a case where the second band group includes nine bands, when the shortest wavelength band among the nine bands is treated as Band 1, and the longest wavelength band among the nine bands is treated as Band 9, the metal 1 and the metal 2 may be distinguished from each other on the basis of the ratio between a pixel value in Band 1 and a pixel value in Band 9 (={(the pixel value in Band 1)/(the pixel value in Band 9)}), . . . , and the ratio between a pixel value in Band 8 and a pixel value in Band 9 (={(the pixel value in Band 8)/(the pixel value in Band 9)}).

In this example, a discrimination condition may be that {(a pixel value in Band 2 for the metal 1)/(a pixel value in Band 9 for the metal 1)}={(a pixel value in Band 2 for the metal 2)/(a pixel value in Band 9 for the metal 2)}, {(a pixel value in Band 4 for the metal 1)/(the pixel value in Band 9 for the metal 1)}>{(a pixel value in Band 4 for the metal 2)/(the pixel value in Band 9 for the metal 2)}, {(a pixel value in Band 5 for the metal 1)/(the pixel value in Band 9 for the metal 1)}>{(a pixel value in Band 5 for the metal 2)/(the pixel value in Band 9 for the metal 2)}, {(a pixel value in Band 6 for the metal 1)/(the pixel value in Band 9 for the metal 1)}>{(a pixel value in Band 6 for the metal 2)/(the pixel value in Band 9 for the metal 2)}, and {(a pixel value in Band 7 for the metal 1)/(the pixel value in Band 9 for the metal 1)}>{(a pixel value in Band 7 for the metal 2)/(the pixel value in Band 9 for the metal 2)}.

In a case where a discrimination condition is derived through machine learning, on the basis of information regarding pixel values in each band and information indicating the type of foreign object, a model for estimating the type of foreign object is created from the information regarding pixel values in each band, and the discrimination condition is derived on the basis of the model.

When the metal 1 is detected as a result of a determination, the processing circuit 210 causes the output apparatus 300 to output a warning. As illustrated in FIG. 9, the processing circuit 210 may cause the storage device 220 to store information indicating that a warning has been output.

Note that, in the above-described example, two types of metal are assumed as foreign objects to be detected; however, objects other than these metals may be detection targets. For example, in a system that inspects foods, a technology similar to the present embodiment may be applied in order to distinguish between insects and burnt portions. The number of types of foreign object for which a warning is to be output is not limited to one and may be two or more. For example, among the first foreign object regions detected on the basis of pixel values in the individual bands of the first band group, a region classified into any one of preset classification lists on the basis of combinations of pixel values for the second band group may be treated as a second foreign object region where a specific foreign object is present.

As described above, according to the present embodiment, through a first-stage detection operation in which a small number of bands are used, one or more regions where one or more foreign objects may be present are first detected as one or more first foreign object regions. Thereafter, through a second-stage detection operation based on a greater number of bands, one or more second foreign object regions that include a specific foreign object are detected from among the one or more first foreign object regions. Through these operations, the calculation load and the inspection time can be significantly reduced, compared with a case where a foreign object is detected on the basis of information regarding all the bands from the entirety of an image.

A method for determining a first foreign object region may be a method in which the following content is taken into consideration. Description will be made assuming that the first band group (that is, one or more wavelength bands) is composed of the wavelength band $W_1$ and the wavelength band $W_N$ in a first-stage foreign object inspection operation.

In S110, the processing circuit 210 calculates the image data $f_1$ for the wavelength band $W_1$ from the compressed image 120 and generates the image 250W$_1$, which includes the image data $f_1$, and calculates the image data $f_N$ for the wavelength band $W_N$ from the compressed image 120 and generates the image 250W$_N$, which includes the image data $f_N$. First images include the image 250W$_1$ and the image 250W$_N$.

In S110, the processing circuit 210 does not calculate, from the compressed image 120, the image data $f_2$ for the wavelength band $W_2$, . . . , and the image data $f_{N-1}$ for the wavelength band $W_{N-1}$. That is, in S110, the processing circuit 210 does not generate the images 250W$_2$ to 250W$_{N-1}$ from the compressed image 120.

In S110, the image data $f_1$ and the image data $f_N$ are obtained by solving not the inverse problem of the above-described Eq. (1) but an inverse problem of Eq. (3) below.

$$g = [H_1 \quad H_3] \begin{bmatrix} f_1 \\ f_N \end{bmatrix}$$

(3)

$$H = \begin{bmatrix} h_{11} & \cdots & h_{1(n \times m)} & h_{1(n \times m \times 1)} & \cdots & h_{1(n \times m \times (N-1))} & h_{1(n \times m \times (N-1)+1)} & \cdots & h_{1(n \times m \times N)} \\ \vdots & & & & \cdots & & & & \vdots \\ h_{(n \times m)1} & \cdots & h_{(n \times m)(n \times m)} & h_{(n \times m)(n \times m+1)} & \cdots & h_{(n \times m)(n \times m(N-1))} & h_{(n \times m)(n \times m(N-1)-1)} & \cdots & h_{(n \times m)(n \times m \times N)} \end{bmatrix}$$

-continued

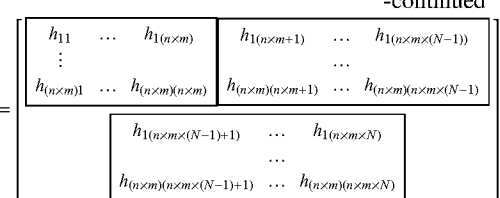

$$= [H_1 \ H_2 \ H_3]$$

$$H_1 = \begin{bmatrix} h_{11} & \cdots & h_{1(n \times m)} \\ \vdots & \ddots & \vdots \\ h_{(n \times m)1} & \cdots & h_{(n \times m)(n \times m)} \end{bmatrix}$$

$$H_2 = \begin{bmatrix} h_{1(n \times m+1)} & \cdots & h_{1(n \times m \times N-1)} \\ \vdots & \ddots & \vdots \\ h_{(n \times m)(n \times m+1)} & \cdots & h_{(n \times m)(n \times m \times (N-1))} \end{bmatrix}$$

$$H_3 = \begin{bmatrix} h_{1(n \times m \times (N-1)+1)} & \cdots & h_{1(n \times m \times N)} \\ \vdots & \ddots & \vdots \\ h_{(n \times m)(n \times m \times (N-1)+1)} & \cdots & h_{(n \times m)(n \times m \times N)} \end{bmatrix}$$

The pixel values of the pixels included in the compressed image 120 may be expressed by $$\begin{bmatrix} P(g_{11}) & \cdots & P(g_{1n}) \\ \vdots & \ddots & \vdots \\ P(g_{m1}) & \cdots & P(g_{mn}) \end{bmatrix}$$

Figure 16:
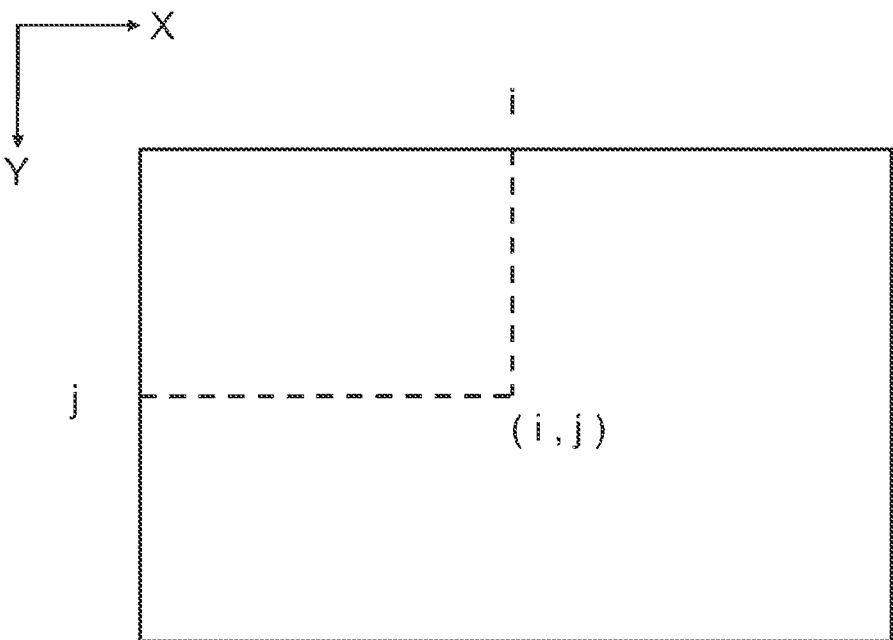
FIG. 16 is a diagram illustrating coordinate axes and coordinates.

$P(g_{ij})$ is a pixel value of a pixel $g_{ij}$ included in the compressed image 120, where i=1 to m, and j=1 to n. The pixel $g_{ij}$ is positioned at coordinates (i,j) in the compressed image 120. The coordinate axes and coordinates may be those as illustrated in FIG. 16.

The data g of the compressed image 120 may be expressed by $$g = (P(g_{11}) \ldots P(g_{1n}) \ldots P(g_{m1}) \ldots P(g_{mn}))^T.$$

An image 250$W_k$ (k=1 to N) corresponding to a wavelength band $W_k$ may be considered to have image data $f_k$. The pixel values of the pixels included in the image 250$W_k$ may be expressed by $$\begin{bmatrix} P(f_{k11}) & \cdots & P(f_{k1n}) \\ \vdots & \ddots & \vdots \\ P(f_{km1}) & \cdots & P(f_{kmn}) \end{bmatrix}$$

$P(f_{kij})$ is a pixel value of a pixel $f_{kij}$ (i=1 to m, j=1 to n) included in the image 250$W_k$. The pixel $f_{kij}$ is positioned at coordinates (i,j) in the image 250$W_k$.

The image data $f_k$ of the image 250$W_k$ may be expressed by $$f_k = (P(f_{k11}) \ldots P(f_{k1n}) \ldots P(f_{km1}) \ldots P(f_{kmn}))^T.$$

A pixel value $P(f_{pij})$ included in image data $f_p$ and a pixel value $P(f_{qij})$ included in image data $f_q$ are pixel values at the same position of a subject. It is sufficient that H be determined such that the pixel $f_{pij}$ and the pixel $f_{qij}$ correspond to the same position of the subject.

To detect a first foreign object region in S120, $r_{11}=P(f_{111})/P(f_{N11})$, . . . , and $r_{mn}=P(f_{1mn})/(f_{Nmn})$ are calculated, and all coordinates (i,j) that satisfy $0.8 \leq r_{ij} \leq 1.2$ are obtained from $r_{11}$, . . . , and $r_{mn}$.

In a case where $0.8 \leq r_{rs} \leq 1.2$ and $0.8 \leq r_{(r+1)s} \leq 1.2$, where $0.8 \leq r_{rs} \leq 1.2$ and $0.8 \leq r_{(r-1)s} \leq 1.2$, where $0.8 \leq r_{rs} \leq 1.2$ and $0.8 \leq r_{r(s+1)} \leq 1.2$, or where $0.8 \leq r_{rs} \leq 1.2$ and $0.8 \leq r_{r(s-1)} \leq 1.2$, a pixel at coordinates (r, s) is determined to be included in a contiguous pixel region ($1 \leq r-1, r+1 \leq m$, $1 \leq s-1$, $s+1 \leq n$).

Even in a case where $0.8 \leq r_{rs} \leq 1.2$, when $0.8 \leq r_{(r+1)s} \leq 1.2$ is not satisfied, $0.8 \leq r_{(r-1)s} \leq 1.2$ is not satisfied, $0.8 \leq r_{r(s+1)} \leq 1.2$ is not satisfied, and $0.8 \leq r_{r(s-1)} \leq 1.2$ is not satisfied, the pixel at coordinates (r, s) may be determined to be not included in a contiguous pixel region.

Suppose that the first foreign object region determined by performing the above-described method is a region having coordinates (r, s), coordinates (r+1, s), coordinates (r, s+1), and coordinates (r+1, s+1), and the following description will be made.

In S140, the coordinates of the first foreign object region, which are the coordinates (r, s), the coordinates (r+1, s), the coordinates (r, s+1), and the coordinates (r+1, s+1), are recorded in the storage device 220.

A method for determining a second foreign object region may be a method in which the following content is taken into consideration. Description will be made assuming that the second band group (that is, second wavelength bands) is composed of a wavelength band $W_t$, a wavelength band $W_u$, a wavelength band $W_v$, and a wavelength band $W_w$ in a second-stage foreign object inspection operation. The number of second wavelength bands (four in this example) is greater than that of the one or more wavelength bands (two in the above-described example). The pixel values of some pixels of an image 250$W_t$ are calculated from the compressed image 120 and the matrix H, and the pixel values of the other pixels of the image 250$W_t$ are not calculated.

The pixel values of some pixels of an image 250$W_u$ are calculated from the compressed image 120 and the matrix H, and the pixel values of the other pixels of the image 250$W_u$ are not calculated.

The pixel values of some pixels of an image 250$W_v$ are calculated from the compressed image 120 and the matrix H, and the pixel values of the other pixels of the image 250$W_v$ are not calculated.

The pixel values of some pixels of an image 250$W_w$ are calculated from the compressed image 120 and the matrix H, and the pixel values of the other pixels of the image 250$W_w$ are not calculated.

That is, (1) $P(f_{trs})$, $P(f_{t(r+1)s})$, $P(f_{tr(s+1)})$, and $P(f_{t(r+1)(s+1)})$ included in $(P(f_{t11}) \ldots P(f_{t1n}) \ldots P(f_{tm1}) \ldots P(f_{tmn}))^T$, which is image data $f_t$ of the image $250W_t$, are calculated. Data other than $P(f_{trs})$, $P(f_{t(r+1)s})$, $P(f_{tr(s+1)})$, and $P(f_{t(r+1)(s+1)})$ among $P(f_{t11})$, . . . , and $P(f_{tmn})$ are not calculated.

(2) $P(f_{urs})$, $P(f_{u(r+1)s})$, $P(f_{ur(s+1)})$, and $P(f_{u(r+1)(s+1)})$ included in $(P(f_{u11}) \ldots P(f_{u1n}) \ldots P(f_{um1}) \ldots P(f_{umn}))^T$, which is image data $f_u$ of the image $250W_u$, are calculated. Data other than $P(f_{urs})$, $P(f_{u(r+1)s})$, $P(f_{ur(s+1)})$, and $P(f_{u(r+1)(s+1)})$ among $P(f_{u11})$, . . . , and $P(f_{umn})$ are not calculated.

(3) $P(f_{vrs})$, $P(f_{v(r+1)s})$, $P(f_{vr(s+1)})$, and $P(f_{v(r+1)(s+1)})$ included in $(P(f_{v11}) \ldots P(f_{v1n}) \ldots P(f_{vm1}) \ldots P(f_{vmn}))^T$, which is image data G of the image $250W_v$, are calculated. Data other than $P(f_{vrs})$, $P(f_{v(r+1)s})$, $P(f_{vr(s+1)})$, and $P(f_{v(r+1)(s+1)})$ among $P(f_{v11})$, . . . , and $P(f_{vmn})$ are not calculated.

(4) $P(f_{wrs})$, $P(f_{w(r+1)s})$, $P(f_{wr(s+1)})$, and $P(f_{w(r+1)(s+1)})$ included in $(P(f_{w11}) \ldots P(f_{w1n}) \ldots P(f_{wm1}) \ldots P(f_{wmn}))^T$, which is image data $f_w$ of the image $250W_w$, are calculated. Data other than $P(f_{wrs})$, $P(f_{w(r+1)s})$, $P(f_{wr(s+1)})$, and $P(f_{w(r+1)(s+1)})$ among $P(f_{w11})$, . . . , and $P(f_{wmn})$ are not calculated.

From (1) to (4), 16 (=4×4) pixel values among mn×4 pixel values are calculated, and (mn−4)×4 pixel values are not calculated.

In S150, a foreign object detection operation based on the second condition is performed using the pixel value $P(f_{trs})$ of the pixel positioned at the coordinates (r, s) included in the image $250W_t$, the pixel value $P(f_{t(r+1)s})$ of the pixel positioned at the coordinates (r+1, s) included in the image $250W_t$, the pixel value $P(f_{tr(s+1)})$ of the pixel positioned at the coordinates (r, s+1) included in the image $250W_t$, and the pixel value $P(f_{t(r+1)(s+1)})$ of the pixel positioned at the coordinates (r+1, s+1) included in the image $250W_t$. In the foreign object detection operation based on the second condition, the above-described four pixel values included in the image $250W_t$ are used, and the other (m×n−4) pixel values included in the image $250W_t$ are not used.

In S150, the foreign object detection operation based on the second condition is performed using the pixel value $P(f_{urs})$ of the pixel positioned at the coordinates (r, s) included in the image $250W_u$, the pixel value $P(f_{u(r+1)s})$ of the pixel positioned at the coordinates (r+1, s) included in the image $250W_u$, the pixel value $P(f_{ur(s+1)})$ of the pixel positioned at the coordinates (r, s+1) included in the image $250W_u$, and the pixel value $P(f_{u(r+1)(s+1)})$ of the pixel positioned at the coordinates (r+1, s+1) included in the image $250W_u$. In the foreign object detection operation based on the second condition, the above-described four pixel values included in the image $250W_u$ are used, and the other (m×n−4) pixel values included in the image $250W_u$ are not used.

In S150, the foreign object detection operation based on the second condition is performed using the pixel value $P(f_{vrs})$ of the pixel positioned at the coordinates (r, s) included in the image $250W_v$, the pixel value $P(f_{v(r+1)s})$ of the pixel positioned at the coordinates (r+1, s) included in the image $250W_v$, the pixel value $P(f_{vr(s+1)})$ of the pixel positioned at the coordinates (r, s+1) included in the image $250W_v$, and the pixel value $P(f_{v(r+1)(s+1)})$ of the pixel positioned at the coordinates (r+1, s+1) included in the image $250W_v$. In the foreign object detection operation based on the second condition, the above-described four pixel values included in the image $250W_v$ are used, and the other (m×n−4) pixel values included in the image $250W_v$ are not used.

In S150, the foreign object detection operation based on the second condition is performed using the pixel value $P(f_{wrs})$ of the pixel positioned at the coordinates (r, s) included in the image $250W_w$, the pixel value $P(f_{w(r+1)s})$ of the pixel positioned at the coordinates (r+1, s) included in the image $250W_w$, the pixel value $P(f_{wr(s+1)})$ of the pixel positioned at the coordinates (r, s+1) included in the image $250W_w$, and the pixel value $P(f_{w(r+1)(s+1)})$ of the pixel positioned at the coordinates (r+1, s+1) included in the image $250W_w$. In the foreign object detection operation based on the second condition, the above-described four pixel values included in the image $250W_w$ are used, and the other (m×n−4) pixel values included in the image $250W_w$ are not used.

Second Embodiment

Figure 14:
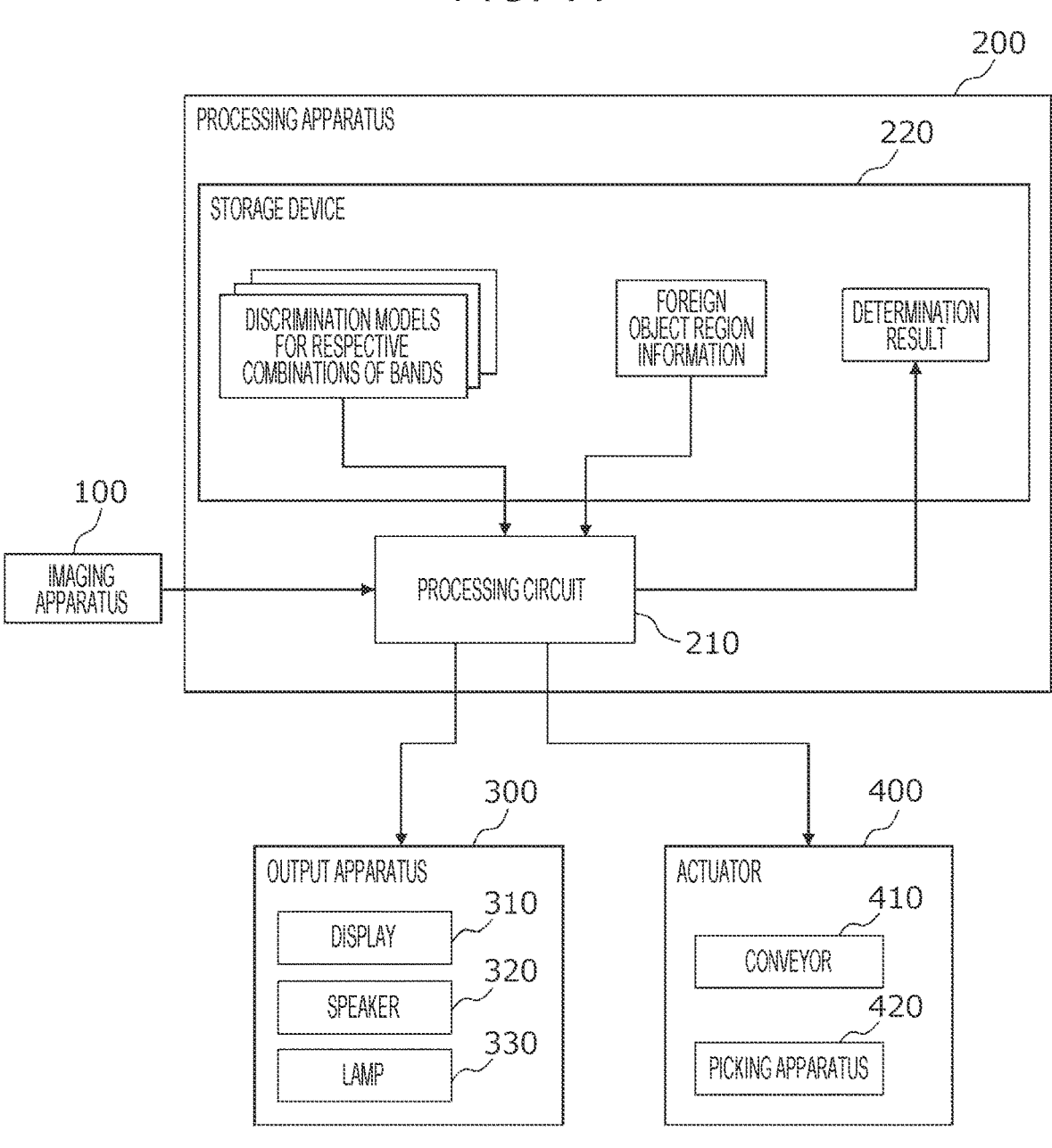
FIG. 14 is a block diagram illustrating an example of the configuration of an inspection system according to a second embodiment.

Next, an inspection system according to a second embodiment will be described. FIG. 14 is a block diagram illustrating an example of the configuration of the inspection system according to the present embodiment.

In the first embodiment, the imaging apparatus 100 and the processing circuit 210 reconstruct images for respective bands from a compressed image using compressed sensing. In contrast, in the present embodiment, the imaging apparatus 100 performs imaging on a band basis, and generates image data including information regarding a desired band group by combining some of these images acquired through imaging. The imaging apparatus 100 in the present embodiment has, instead of the filter array 110 as illustrated in FIGS. 1A to 1D, a mechanism for performing imaging on a band basis and generating images for the respective bands. In the present embodiment, the imaging apparatus 100 directly generates images for the respective bands. Thus, the storage device 220 does not store reconstruction tables for use in generation of images for the respective bands.

In the present embodiment, first, the imaging apparatus 100 performs imaging for each of the bands included in the first band group, and generates images corresponding to the bands. The processing circuit 210 performs an operation for detecting a first foreign object region from the images for the first band group and generated by the imaging apparatus 100, in accordance with the discrimination model based on the first condition. In a case where a first foreign object region is detected, the imaging apparatus 100 performs imaging for each of the bands of the second band group, which includes a larger number of bands than the first band group, and generates images corresponding to the bands. The processing circuit 210 performs foreign object detection processing using these images in accordance with the discrimination model based on the second condition, and causes the storage device 220 to store the result. In a case where a foreign object region that satisfies the second condition is detected, the processing circuit 210 transmits a control signal to the output apparatus 300 and the actuator 400. Upon receiving the control signal, the output apparatus 300 causes, for example, the display 310 to output a warning. Upon receiving the control signal, the actuator 400 controls, for example, the conveyor 410.

Figure 15:
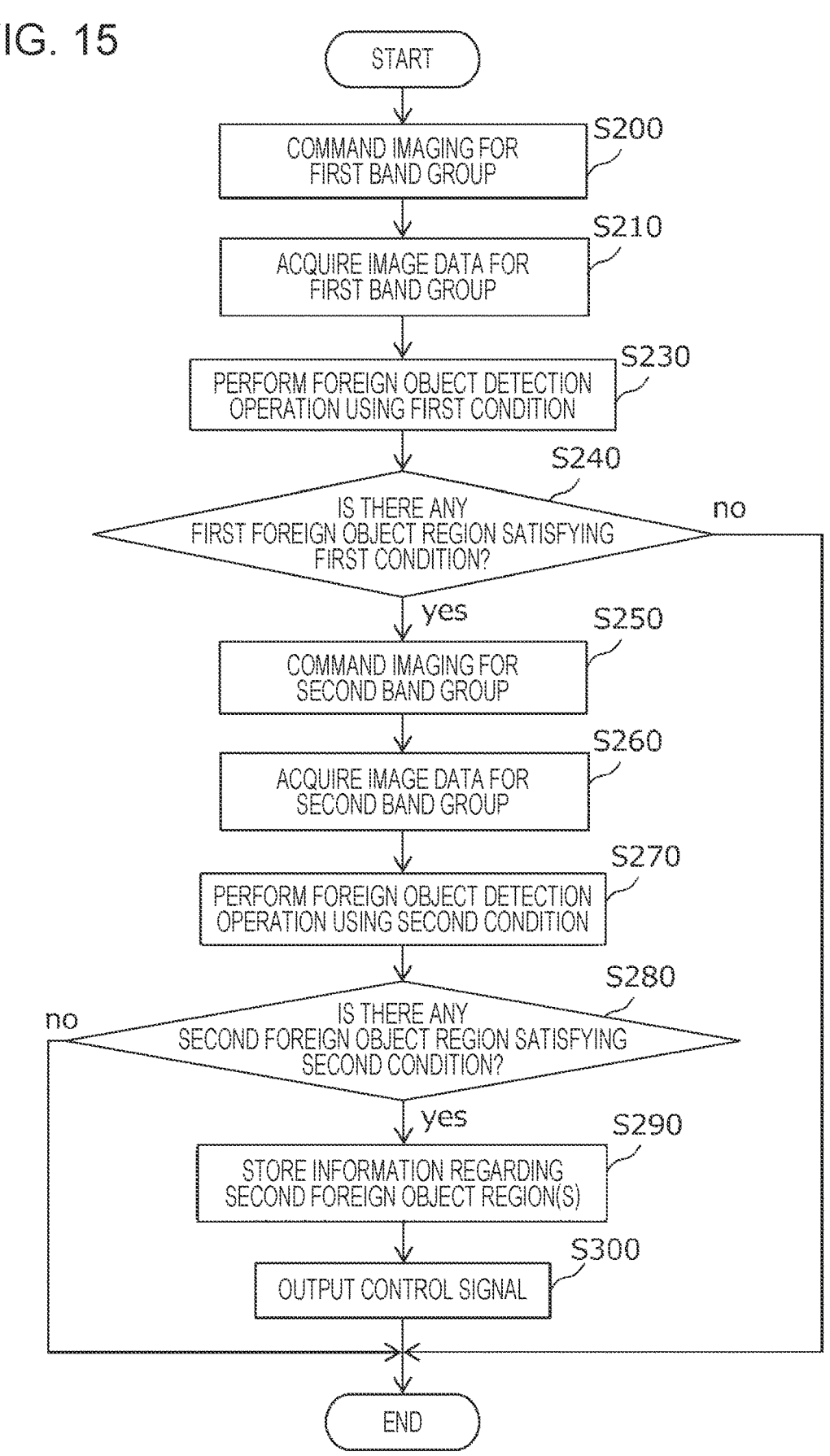
FIG. 15 is a flow chart illustrating an example of a two-stage foreign object detection operation in the second embodiment.

FIG. 15 is a flow chart illustrating an example of a two-stage foreign object detection operation using captured images according to the present embodiment. The processing circuit 210 in this example commands the imaging apparatus 100 to perform imaging for each of the bands that belong to the first band group (Step S200). As a result, the imaging apparatus 100 generates image data for each band of the first band group. For example, in a case where the first band group is composed of a band around 350 nm and a band around 600 nm, imaging is performed using illumination light whose wavelength is set to 350 nm, and then imaging is performed using illumination light whose wavelength is set to 600 nm. The wavelength of illumination light may be adjusted by the user every time imaging is performed, or may be automatically adjusted when the imaging apparatus 100 is provided with an illumination device. The processing circuit 210 acquires the image data generated for the first band group (Step S210). The processing circuit 210 performs processing for detecting a first foreign object region from the acquired image data in accordance with the discrimination model based on the first condition (Step S230). The processing circuit 210 determines whether or not a first foreign object region that satisfies the first condition is present (Step S240). In a case where a first foreign object region is not detected, the process ends. In a case where a first foreign object region is detected, the processing circuit 210 causes the imaging apparatus 100 to perform, for each of the bands that belong to the second band group, imaging of a relatively small region including the first foreign object region to generate image data for the band (Step S250). The processing circuit 210 acquires image data for the second band group, the image data being generated for the relatively small region including the first foreign object region (Step S260). The processing circuit 210 performs processing for detecting a second foreign object region from the acquired image data in accordance with the discrimination model based on the second condition (Step S270). The processing circuit 210 determines whether or not a second foreign object region that satisfies the second condition is present (Step S280). In a case where a second foreign object region is not detected, the process ends. In a case where a second foreign object region is detected, the processing circuit 210 causes the storage device 220 to store information regarding the second foreign object region (Step S290). The processing circuit 210 outputs a control signal to the output apparatus 300 and the actuator 400 (Step S300). Upon receiving the control signal from the processing circuit 210, the output apparatus 300 causes, for example, the display 310 to display a warning. Upon receiving the control signal from the processing circuit 210, the actuator 400 controls, for example, the conveyor 410 and the picking apparatus 420.

Note that, in the present embodiment, imaging for each band is performed by performing imaging multiple times while switching the wavelength of illumination light; however, imaging for each band may be performed using other methods. For example, the imaging apparatus 100 may perform imaging multiple times while switching between filters having different transmission wavelength ranges. The imaging apparatus 100 may be a line scan hyperspectral camera provided with a prism or a diffraction grating.

As described above, in the present embodiment, imaging is performed multiple times for each band. When the number of bands for which imaging is to be performed is large, a long time will be needed to perform inspection. In the present embodiment, imaging is performed for the first band group, which has a relatively small number of bands, and imaging is performed for the second band group, which has a larger number of bands than the first band group, only in a case where a foreign object is detected in imaging for the first band group. Thus, in most cases where a foreign object is not detected, inspection is completed without requiring a long time for imaging. Only in a case where a foreign object is detected, a detailed inspection is performed for the second band group, and thus the time required to perform the entire inspection process can be significantly reduced.

The technology according to the present disclosure is useful for, for example, a camera and a measurement device that acquire multi-wavelength images. The technology according to the present disclosure is available for applications for detecting, for example, foreign objects contained in items such as industrial products or foods.

What is claimed is:

1. A method for detecting a specific foreign object included in an inspection target, the method comprising:
   acquiring first image data for the inspection target, for which pixels each have a pixel value for a first band group including one or more wavelength bands;
   determining, from the first image data, one or more pixel regions that satisfy a first condition to be one or more first foreign object regions;
   acquiring second image data for one or more regions corresponding to the one or more first foreign object regions, the one or more regions having pixels each of which has pixel values for a second band group including a larger number of wavelength bands than the first band group;
   determining, from the second image data, one or more pixel regions that satisfy a second condition, which is different from the first condition, to be one or more second foreign object regions, in which the specific foreign object is present; and
   outputting information regarding the one or more second foreign object regions,
   wherein the second image data is generated such that the second image data does not include pixels for regions corresponding to at least a portion of pixel regions of the first image data that are outside the one of more first foreign object regions.

2. The method according to claim 1, wherein the first condition is that the one or more pixel regions are constituted by contiguous pixels having pixel values for the first band group, the pixel values satisfying a predetermined condition, and that the size of each pixel region exceeds a predetermined size.

3. The method according to claim 1, wherein the second condition is that each of the one or more pixel regions is classified into any one of preset classification lists, based on the pixel values for the second band group.

4. The method according to claim 1, wherein
   acquiring the first image data includes acquiring compressed image data, which is obtained by compressing, as a two-dimensional image, pieces of image information regarding respective wavelength bands including the second band group, and generating the first image data from the compressed image data, and
   acquiring the second image data includes extracting the one or more regions corresponding to the one or more first foreign object regions from the compressed image data, and generating the second image data, based on data of the one or more extracted regions.

5. The method according to claim 4, wherein
   generating the first image data includes reconstructing the first image data from the compressed image data using a first reconstruction table corresponding to the first band group, and
   generating the second image data includes reconstructing the second image data from the data of the one or more extracted regions using a second reconstruction table corresponding to the second band group.

6. The method according to claim 5, wherein
   the compressed image data is generated by an imaging apparatus including a filter array and an image sensor,
   the filter array includes filters having different transmission spectra from each other, and the first reconstruction table and the second reconstruction table are generated based on a distribution of the transmission spectra of the filters.

7. The method according to claim 1, wherein the first image data is acquired through a first imaging operation performed by an imaging apparatus, and the second image data is acquired through a second imaging operation performed by the imaging apparatus.

8. The method according to claim 1, further comprising:

causing an output apparatus to output a warning in a case where the one or more second foreign object regions are detected.

9. The method according to claim 1, further comprising:

causing a storage device to store a position of each of the one or more first foreign object regions and a position of each of the one or more second foreign object regions.

10. An apparatus for performing an operation for detecting a foreign object included in an inspection target, the apparatus comprising:

a processor; and a storage medium in which a computer program is stored, wherein the processor executes the computer program to perform acquiring first image data for the inspection target, for which pixels each have a pixel value for a first band group including one or more wavelength bands, determining, from the first image data, one or more pixel regions that satisfy a first condition to be one or more first foreign object regions, acquiring second image data for one or more regions corresponding to the one or more first foreign object regions, the one or more regions having pixels each of which has pixel values for a second band group including a larger number of wavelength bands than the first band group, determining, from the second image data, one or more pixel regions that satisfy a second condition, which is different from the first condition, to be one or more second foreign object regions, in which the specific foreign object is present, and outputting information regarding the one or more second foreign object regions, wherein the second image data is generated such that the second image data does not include pixels for regions corresponding to at least a portion of pixel regions of the first image data that are outside the one of more first foreign object regions.

11. A non-transitory computer-readable recording medium storing a program for detecting a foreign object included in an inspection target, the program causing a computer to execute:

acquiring first image data for the inspection target, for which pixels each have a pixel value for a first band group including one or more wavelength bands;

determining, from the first image data, one or more pixel regions that satisfy a first condition to be one or more first foreign object regions;

acquiring second image data for one or more regions corresponding to the one or more first foreign object regions, the one or more regions having pixels each of which has pixel values for a second band group including a larger number of wavelength bands than the first band group;

determining, from the second image data, one or more pixel regions that satisfy a second condition, which is different from the first condition, to be one or more second foreign object regions, in which the specific foreign object is present; and outputting information regarding the one or more second foreign object regions, wherein the second image data is generated such that the second image data does not include pixels for regions corresponding to at least a portion of pixel regions of the first image data that are outside the one of more first foreign object regions.

12. A method for detecting a foreign object included in an inspection target, the method comprising:

acquiring one or more first images, the one or more first images corresponding to one or more first wavelength bands;

determining, based on the one or more first images, one or more regions that satisfy a first condition to be one or more first foreign object regions;

acquiring second images, each of the second images including one or more regions corresponding to the one or more first foreign object regions, the second images corresponding to second wavelength bands, a total number of the second wavelength bands being greater than a total number of the one or more first wavelength bands;

determining, based on the second images, one or more regions that satisfy a second condition, which is different from the first condition, to be one or more second foreign object regions, in which the foreign object is present; and outputting information regarding the one or more second foreign object regions, wherein the second images are generated such that the second images do not include pixels for regions corresponding to at least a portion of pixel regions of the one or more first images that are outside the one of more first foreign object regions.

13. The method according to claim 12, wherein first pixel values of first pixels included in each of the one or more first images are calculated based on a third image of the inspection target, the third image being captured using a camera, the first pixels being included in a region corresponding to the one or more first foreign object regions and a region other than the one or more first foreign object regions, pixel values of pixels included in each of the second images and included in the one or more regions corresponding to the one or more first foreign object regions are calculated based on the third image, and pixel values of pixels included in each of the second images and included in a region other than the one or more regions corresponding to the one or more first foreign object regions are not calculated.

14. The method according to claim 1, wherein the second image data is not acquired after determination that the first image data does not include the one or more pixel regions that satisfy the first condition.

* * * * *